United States Patent [19]
McQueen et al.

[11] Patent Number: 6,069,696
[45] Date of Patent: *May 30, 2000

[54] OBJECT RECOGNITION SYSTEM AND METHOD

[75] Inventors: Alexander M. McQueen; Craig D. Cherry, both of Eugene, Oreg.; Joseph F. Rando, Los Altos Hills, Calif.; Matt D. Schler, Eugene, Oreg.; David L. Latimer, Eugene, Oreg.; Steven A. McMahon, Eugene, Oreg.; Randy J. Turkal, Eugene, Oreg.; Brad R. Reddersen, Eugene, Oreg.

[73] Assignee: PSC Scanning, Inc., Eugene, Oreg.

[*] Notice: This patent issued on a continued prosecution application filed under 37 CFR 1.53(d), and is subject to the twenty year patent term provisions of 35 U.S.C. 154(a)(2).

[21] Appl. No.: 08/663,324

[22] Filed: Jun. 7, 1996

Related U.S. Application Data

[60] Provisional application No. 60/000,048, Jun. 8, 1995, provisional application No. 60/000,054, Jun. 8, 1995, provisional application No. 60/000,055, Jun. 8, 1995, and provisional application No. 60/000,072, Jun. 8, 1995.

[51] Int. Cl.[7] ..................................... G01J 3/28
[52] U.S. Cl. .................. 356/326; 356/328; 235/383
[58] Field of Search .................... 356/402–411, 326, 356/328, 425; 250/226; 235/467, 383, 462, 462.2–462.31, 462.32–462.41, 381; 209/587; 186/61

[56] References Cited

U.S. PATENT DOCUMENTS

| | | |
|---|---|---|
| 3,747,755 | 7/1973 | Senturia et al. . |
| 4,106,628 | 8/1978 | Warkentin et al. . |
| 5,086,879 | 2/1992 | Latimer et al. . |
| 5,125,039 | 6/1992 | Hawkins . |
| 5,139,335 | 8/1992 | Lundeen et al. ............... 356/328 |
| 5,141,323 | 8/1992 | Kipphan et al. . |
| 5,166,755 | 11/1992 | Gat .................................. 250/226 X |

(List continued on next page.)

FOREIGN PATENT DOCUMENTS

| | | |
|---|---|---|
| 680205A2 | 6/1995 | European Pat. Off. . |
| 685814A2 | 6/1995 | European Pat. Off. . |

OTHER PUBLICATIONS

Alman et al, "Eliminating Bottleneck in Plastics Recycling" Energy and Environment Aug. 1992, pp. 4–5.

(List continued on next page.)

*Primary Examiner*—K. P. Hantis
*Attorney, Agent, or Firm*—Lyon & Lyon LLP

[57] ABSTRACT

An object recognition system comprises a sensing apparatus for collecting light reflected from objects presented at a point-of-sale machine. The sensing apparatus includes a mechanism, such as a holographic disk or diffraction grating, for separating the color components of the light reflected from the object and directing, the color components onto an optical detector such as a two-dimensional imaging array, or a one-dimensional imaging array or single photo-sensitive optical cell used in conjunction with a rotating mirror. A pattern recognizer compares the spectral response, including the locations, amplitudes and widths of energy peaks of the different color components, against premeasured characteristics of known objects in order to classify the object. The weight of the object can be measured with a scale, and the density of the object calculated, with the weight and density being used by the pattern recognizer to further classify the object. In one embodiment, a plurality of narrowband illumination sources are operated in time-sequential manner, each illuminating with a different wavelength band of light, in order to allow separate color measurements. The object recognition system may be integrated in a single unit along with an optical code reader, and may share all or part of the same exit aperture therewith. The object recognition system may include thermal detection or a particle source and secondary emission detection device, either alone or in conjunction with other object recognition means.

49 Claims, 14 Drawing Sheets

U.S. PATENT DOCUMENTS

| | | |
|---|---|---|
| 5,202,784 | 4/1993 | Reddersen . |
| 5,231,461 | 7/1993 | Silvergate et al. . |
| 5,296,689 | 3/1994 | Reddersen et al. . |
| 5,303,037 | 4/1994 | Taranowski ............................ 356/406 |
| 5,340,970 | 8/1994 | Wolfe, Jr. et al. . |
| 5,371,361 | 12/1994 | Arends et al. . |
| 5,410,108 | 4/1995 | Williams et al. . |
| 5,475,207 | 12/1995 | Bobba et al. . |
| 5,579,921 | 12/1996 | Mallant et al. . |
| 5,609,223 | 3/1997 | Iizaka et al. . |
| 5,729,473 | 3/1998 | Blanc et al. . |

OTHER PUBLICATIONS

Dickson, LeRoy D. et al., "Optics and holography in the IBM Supermarket Scanner", *Advances in Laser Scanning Technology*, SPIE Proceedings, vol. 299 (Aug. 1981), pp. 163–168.

Ikeda, Hiroyuki et al., "Shallow–Type Truncated Symbol–Reading Point–Of–Scale Hologram Scanner", *Applied Optics*, vol. 24, No. 9 (May 1, 1985), pp. 1366–1370.

"Fujitsu Pioneering Holography Products", *What's Happening in Electronics*, vol. 7, No. 10, (Oct. 1985).

Ikeda, Hiroyuki et al., "Bar Code Reader Using Optically Generated Holograms", *Japan J. Appl. Phys.*, vol. 15, No. 12 (1976).

Dickson, LeRoy D., "Bar Code Scanning in a Manufacturing Environment", *IBM Holographic Scanning* (1984).

OBJECT RECOGNITION SYSTEM AND METHOD

RELATED APPLICATION INFORMATION

This application is a continuing application of U.S. Provisional Application Serial Nos. 60/000,048, 60/000,054, 60/000,055, and 60/000,072, each filed on Jun. 8, 1995, and each hereby incorporated by reference as if set forth fully herein.

FIELD OF THE INVENTION

The field of the present invention relates to automated identification and classification of objects.

BACKGROUND OF THE INVENTION

In conventional retail stores, when objects such as apples, strawberries, lettuce or other produce are purchased, the object(s) must be manually identified by a checkstand operator who then enters identifying information into a point-of-sale machine to complete a transaction. This manual process requires the checkstand operator to be proficient in identifying the different types of items that can be purchased, such as the various types of produce. Because the process is manual and depends upon the skill and training of the checkstand operator, the process is error prone and slow, even if specially trained personnel perform the manual identification task. Moreover, special training needed by checkstand operators to recognize the various different objects to be purchased can be expensive and time consuming.

One technique that has been developed to assist checkstand operators in the identification process is the placing of labels with a numerical identification code on the produce items prior to their purchase. The checkstand operator manually enters the code into the point-of-sale machine at the time of purchase. This technique has the disadvantage of requiring the identifying labels with numerical codes to be applied to the produce items at some point prior to sale, which can be costly with regard to both printing of the labels and labor to apply them to the produce items. Further, some products are difficult to label or cannot be labelled. In addition, this technique still requires manual entry of the numerical codes by the checkstand operator, which is slow and prone to errors.

To reduce the reliance on manual identification of codes and the labor intensive placement of labels on produce, automatic produce and grocery item recognition systems have been proposed. For example, one such proposed system utilizes a color video camera to detect visual cues and analyzes certain visual characteristics such as color, texture, shape and size in an attempt to determine enough "uniqueness" of the product to identify it. Such systems have yet to prove feasible in handling the variable characteristics in like items, and the changing characteristics of produce items as they age or ripen.

It would therefore be advantageous to provide a system for automatic recognition of items, such as produce items to be purchased at retail stores. It would further be advantageous to provide such a system that accurately identifies items despite variance in visual characteristics between like items, and despite potentially changing characteristics of produce items as they age or ripen.

SUMMARY OF THE INVENTION

The present invention provides in one aspect an object recognition system and method capable of identifying products with increased accuracy.

In one embodiment, an object recognition system comprises a sensing apparatus for collecting light reflected from objects presented at a point-of-sale machine. The sensing apparatus includes a mechanism for separating the color components of the light reflected from the unknown object and directing the color components onto an optical detector. The mechanism for separating the color components may incorporate a diffraction grating or a holographic element. Alternatively, it may incorporate a plurality of narrowband illumination sources operating in time-sequential manner, each illuminating with a different wavelength band of light.

The optical detector may be embodied as a two-dimensional imaging array, or a one-dimensional imaging array (possibly used in conjunction with a rotating mirror), or, in some embodiments, a single photo-sensitive cell (possibly used in conjunction with a rotating mirror). The object recognition system measures the spectral response of the object or objects to be identified and analyzes an electrical signal output from the optical detector. A pattern recognition system processes the spectral response data from the sensing apparatus and determines the likely identity of the object based at least in part on the spectral response of the object. Spatial variations in spectral response characteristics representing variance in shading over the surface of the object may also be used in the object recognition process.

A preferred pattern recognition means includes a database of stored spectral response patterns and other product-specific characteristics defined within a multi-dimensional coordinate space, and employs a pattern recognition algorithm such as a nearest neighbor classification.

In various embodiments, item information collected at a point-of-sale includes item weight, measured by a weighing device which may or may not be integrated with the object recognition system as a single unit. The object recognition may also measure or calculate other information such as color, size, shape, density, and texture, and use this information to assist in the identification process.

In another embodiment, an optical code reader and additional data gathering unit are co-located within a single, integrated unit. The additional data gathering unit may be an object recognition system, or some other type of data gathering unit. The optical code reader and additional data gathering unit preferably share all or part of the same exit aperture. By such integration, the operator need not move items from one data collection surface to another, and the economies of shared components are realized. The optical code reader in some embodiments may be a multi-dimensional device. The integrated unit may also be combined with a scale.

In an alternative embodiment, a thermal detection system including means for differential thermal analysis is used, either alone or in conjunction with other object recognition means, for differentiating and identifying products.

In another alternative embodiment, a particle source and secondary emission detection device are utilized, either alone or in conjunction with other object recognition means, for differentiating and identifying products.

BRIEF DESCRIPTION OF THE DRAWINGS

The various objects, features and advantages of the present invention are fully explained in the detailed description of the preferred embodiments of the invention found below, together with the figures, wherein.

DETAILED DESCRIPTION OF THE PREFERRED EMBODIMENT

Figure 1:
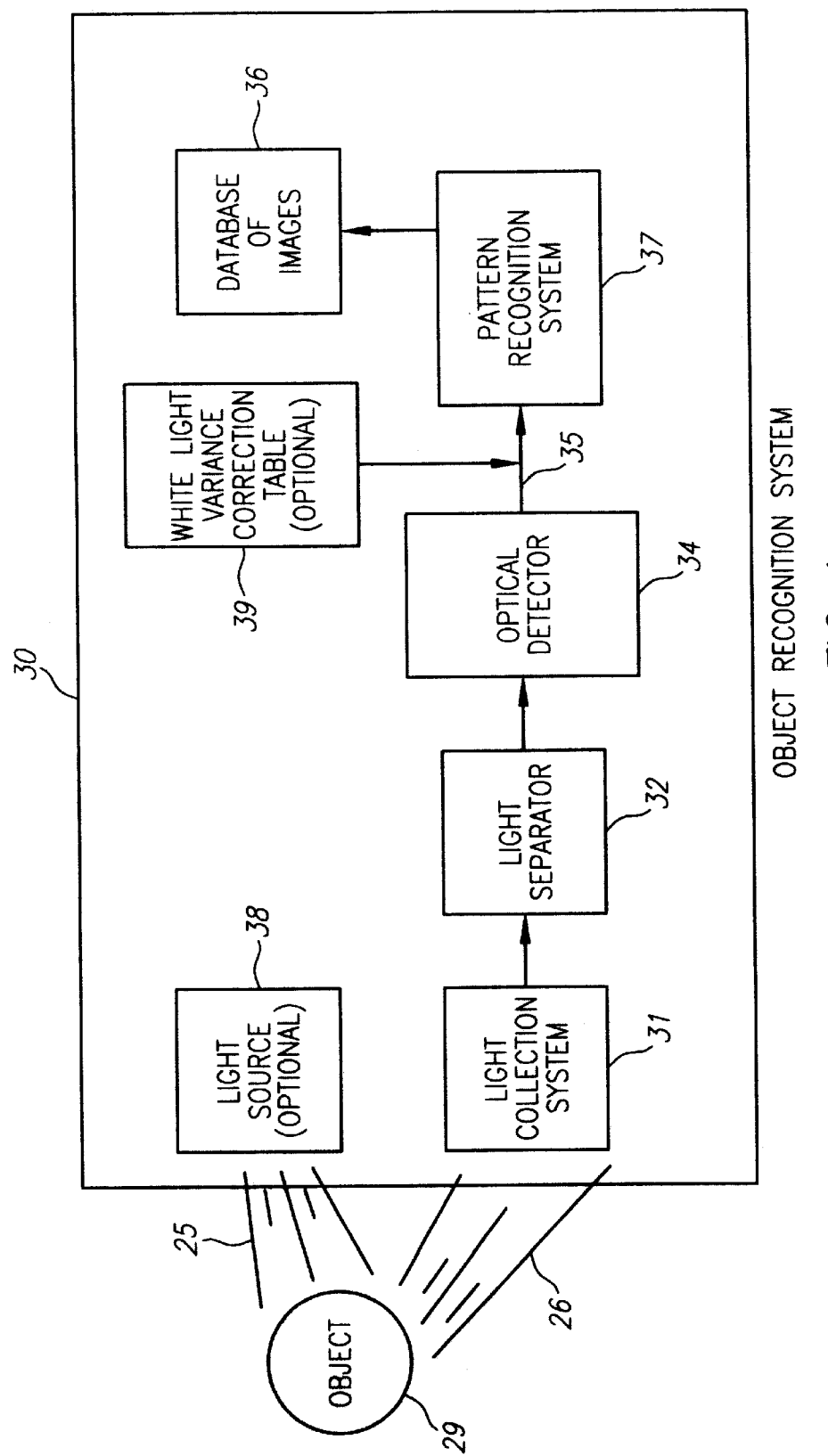
FIG. 1 is a block diagram of an object recognition system in accordance with one or more aspects of the present invention.

FIG. 1 is a block diagram of an object recognition system 30 in accordance with one or more aspects of the present invention. The object recognition system 30 generally includes sensing apparatus for collecting light reflected from objects presented at a point-of-sale machine, and a system for measuring the spectral response of the object or objects to be identified by analyzing an electrical signal output from an optical sensor.

More specifically, the FIG. 1 object recognition system 30 comprises a light collection system 31 connected to a light separator 32. A light source 38 emits light 25 (preferably uniform white light) which may be reflected from an object 29 to be recognized, and the reflected light 26 is gathered by the light collection system 31 and directed to the light separator 32. The light separator 32 directs light in a manner specified later herein onto an optical detector 34 (for example, a one-dimensional imaging array or a two-dimensional imaging array) for detecting the reflected light. A pattern recognition system 37 is connected to the optical detector 34 and processes spectral response data from the optical detector 34, along with other data that may be provided, to determine the likely identity of the object based at least in part on the spectral response data.

Figure 2:
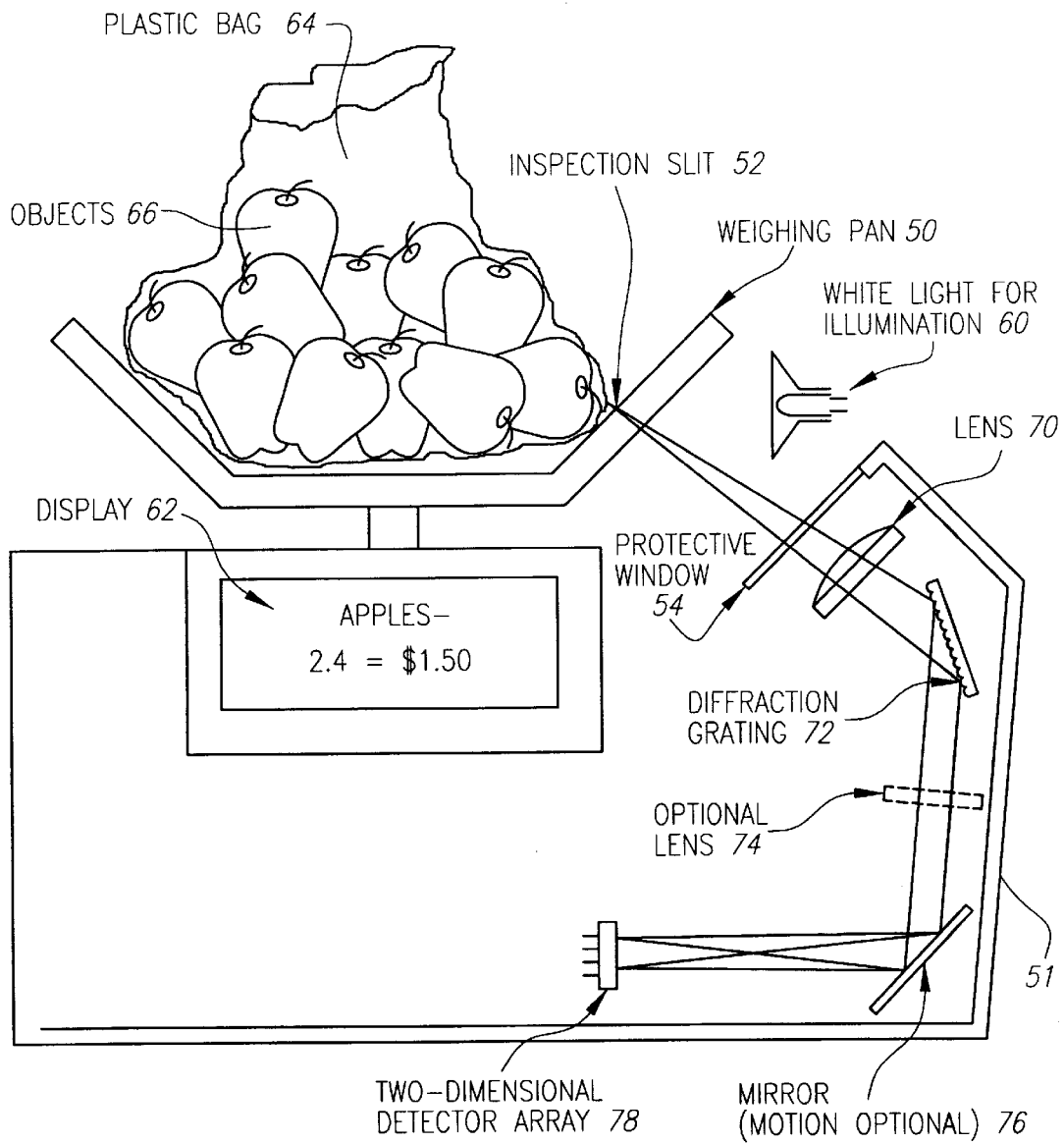
FIG. 2 is a diagram of a portion of a system for measuring the spectral profile of an object or a set of objects using a diffraction grating.

FIG. 2 is a diagram of a portion of an apparatus and system for object recognition by measuring the variation in spectral response of an object or set of objects 66. In FIG. 2, a housing 51 has a weighing pan (or weighing plate) 50 mounted atop it in a conventional fashion. Objects 66 placed on the weighing pan 50 are measured in weight by a scale mechanism (not shown), and the resulting weight displayed on a visual display 62 (such as a standard LED display). Internal electronics connected to or integral with the scale mechanism convert the weight value into a total price according to lookup tables stored within the electronics. The visual display 62 displays the price next to the product weight, and optionally also displays the name of the object being recognized (e.g., "apples") by the optical recognition system.

The apparatus and system of FIG. 2 further comprises a light source 60 preferably having an unobstructed beampath to the objects 66 being placed on the weighing pan 50. Preferably, the light source 60 is triggered to an on state when objects 66 are placed on the weighing pan 50 (by responding, for example, to an electrical signal output from the scale mechanism), and is shut off when objects 66 are removed from the weighing pan 50.

The housing 51 has a protective window 54 through which light reflected from the object or objects 66 passes, to be collected to a lens 70. The protective window 54 is preferably located so as to receive in an unobstructed manner light reflected from the objects 66. Thus, the weighing pan 50 may be open on one side or have an opening on one end to allow reflected light to arrive at and pass through the protective window 54. Preferably, reflected light from objects 66 is passed through an inspection slit 52 to protective window 54 and then to lens 70. Light collected by lens 70 is focused onto a diffraction grating 72 placed at an angle (as further explained below) to the lens 70. Light from the diffraction grating 72 may optionally be passed through another lens 74 (to increase resolution, if necessary) and then reflected off a folding mirror 76 to an optical detector 78 (e.g., a one-dimensional imaging array or a two-dimensional imaging array). The folding mirror 76 may optionally be rotatable along one or more axes, and by its rotation increase the field of view of the light gathering system.

The folding mirror 76 allows a more compact packaging of the FIG. 2 apparatus, and is not absolutely necessary. Other folding mirrors may optionally be used in various locations along the optical path to allow convenient packaging of the apparatus.

In operation, light source 60 is energized when objects are presented to the system or placed on weighing pan 50. Light source 60 preferably emits uniform white light, but can provide non-uniform light or other shades of light, depending on the nature of the products to be identified. The greater the color differentiation and other distinctions between the products to be identified, the less uniform the light from light source 60 can be, and the less of a need for light source 60 to emit pure white light. In some embodiments, such as those incorporating techniques described in copending U.S. patent application Ser. No. 08/363,258 filed Dec. 23, 1994, hereby incorporated by reference as if set forth fully herein, ambient light may be used without a light source 60 being necessary.

Light reflected from objects 66 is collected along a path defined by inspection slit 52. Inspection slit 52 may comprise an actual physical opening, or it may alternatively comprise a transparent window in an opaque surface of weighing pan 50. The light emitted from light source 60 is reflected from objects 66, the reflected light then being collected by lens 70, directed onto diffraction grating 72, and then directed to optical detector 78. Diffraction grating 72 is preferably angularly oriented with respect to inspection slit 52 such that angular dispersion with wavelength in the image focused on optical detector 78 is substantially perpendicular to the long axis of inspection slit 52, as imaged upon optical detector 78. Optical detector 78 captures the image and produces an output signal in response thereto.

Figure 7:
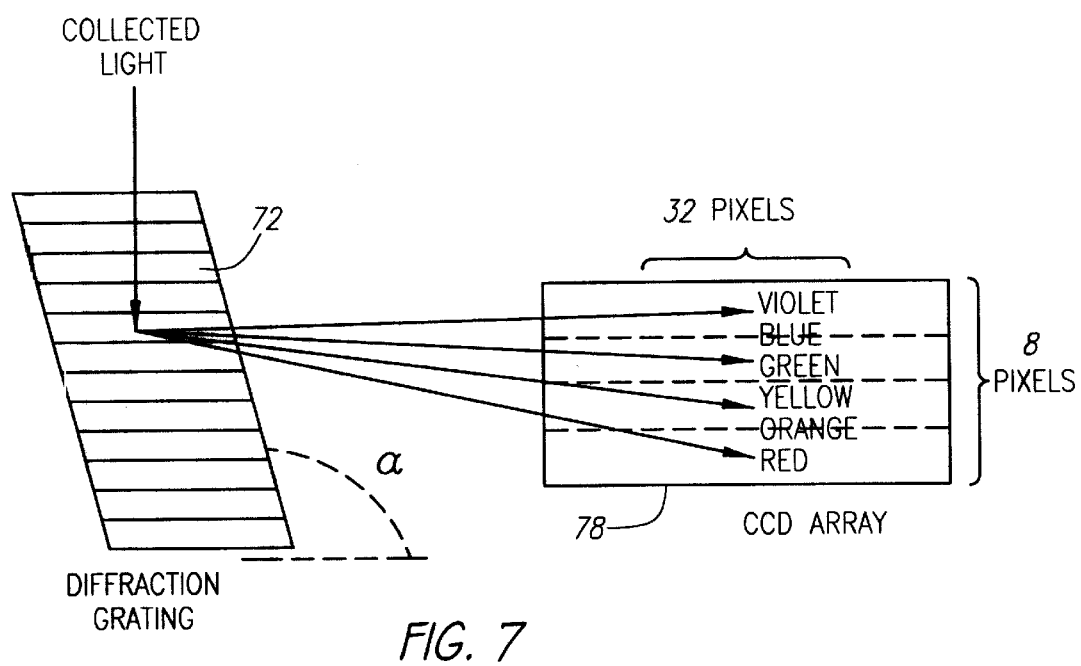
FIG. 7 is a diagram showing the effect of a diffraction grating on incident light, and the reflection of such light onto a CCD array.

FIG. 7 is a diagram illustrating the effect of the diffraction grating 72 on the incoming light. The diffraction grating 72 separates the incoming light, in a manner similar to a prism, according to the wavelength components of the reflected light. Thus, the different color components of the incoming light are separated and split into different directions as shown in FIG. 7. The light incident off diffraction grating 72 is directed onto optical detector 78, shown in FIG. 7 as a two-dimensional CCD imaging array. The different color components are directed onto different areas of the optical detector 78 by the operation of the diffraction grating 72. The diffraction grating 72 thus produces an image having variation in wavelength along one axis and variation in position along the other axis (corresponding to the inspection slit 52). The optical detector 78 receives the strongest light intensities for those color components that are most prevalent, and the weakest light intensities for those color components that are least prevalent.

The optical detector 78 outputs a signal having an amplitude corresponding to the intensity of the color components light incident upon it at each location. If embodied as a two-dimensional imaging array, the optical detector 78 outputs a row-by-row sequence of pixel data, with the amplitude of the output signal for each pixel corresponding to the intensity of the color component at that pixel location. If embodied as a one-dimensional imaging array, the optical detector 78 outputs a sequence of pixel data, with the amplitude of the output signal for each pixel corresponding to the intensity of the color component at that pixel location. If the optical detector 78 is embodied as a CCD device, a correction factor may be needed to the output signal to adjust for variance in response to different light wavelengths. The optical system is preferably configured so that it is known in advance which light wavelengths will be directed to which portions of the optical detector 78, so that predetermined correction factors for this purpose can be calculated and stored within the object recognition system 30.

The angle α at which the diffraction grating 72 is oriented with respect to the optical detector 78 (taking into consideration any folding mirrors or other optical components in the optical path) is preferably such that the full range of color components in the objects to be recognized falls onto the optical detector 78. At the same time, only those colors needed to recognize the objects 66 expected to be presented to the object recognition system are preferably directed onto the optical detector 78, so as to maintain the highest possible resolution.

One axis of two-dimensional detector array 78 shown in FIG. 7 corresponds to the long dimension of slit 52, and the second axis of two-dimensional detector array 78 corresponds to the range of wavelengths resolved by diffraction grating 72. Optional lens 74 (see FIG. 2), if included, provides increased spectral resolution. In a presently preferred embodiment wherein the detector array 78 is embodied as a two-dimensional imaging array, detector array 78 has 256 or more pixels along the axis corresponding to the long axis of sampling slit 52, and 256 or more pixels along the axis corresponding to the wavelength axis. The optical detector 78 may be smaller or larger, depending on system requirements, but larger area imaging arrays tend to increase the system cost.

Figures 6A, 6B:
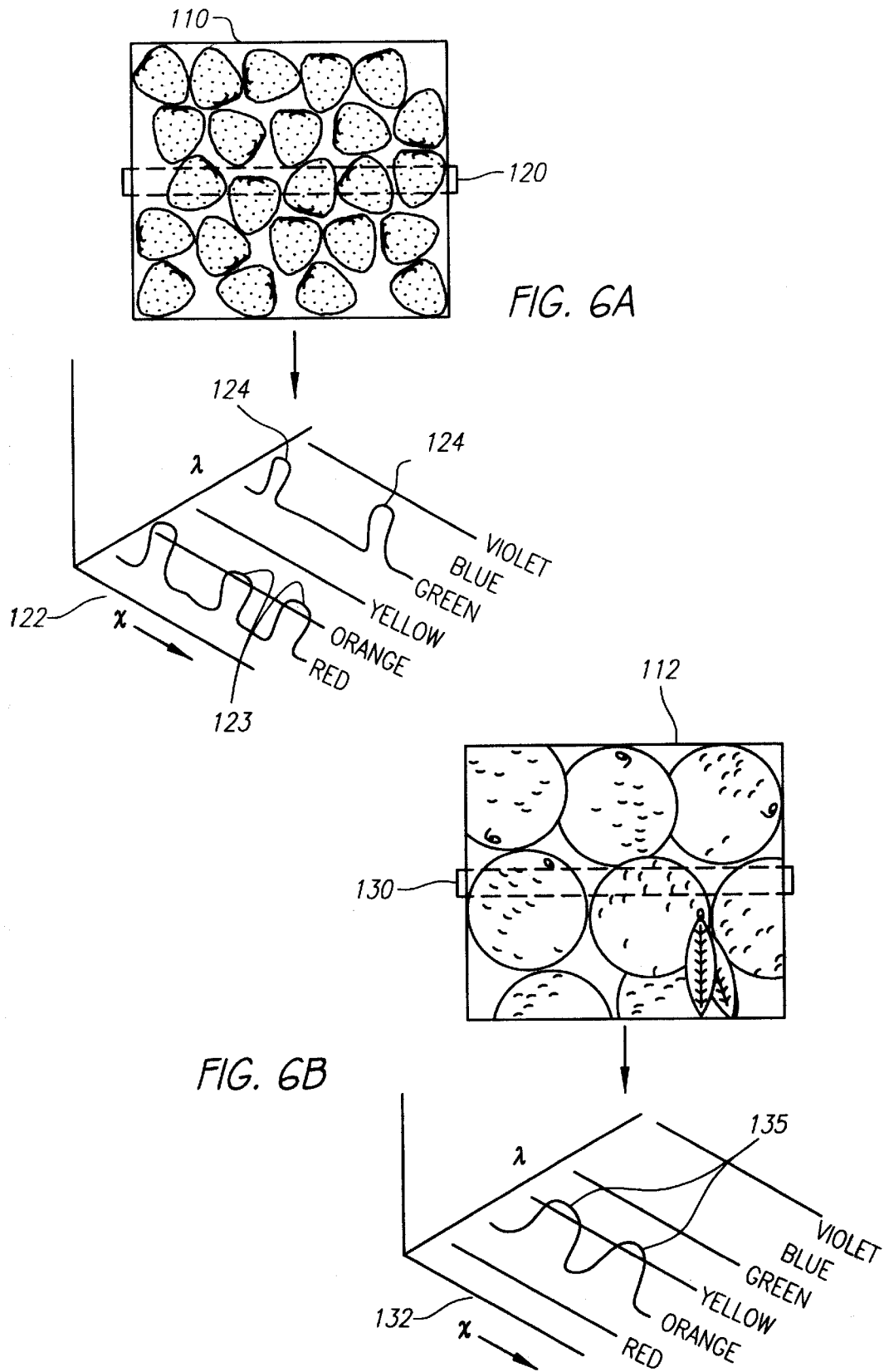
FIGS. 6A and 6B are diagrams showing exemplary images of two different kinds of fruit, and their corresponding spectral profiles.

FIGS. 6A and 6B are waterfall plots for different objects showing light intensity versus wavelength as a function of position along the axes of the optical detector 78. In FIG. 6A, a portion 120 of an image 110 is received by the FIG. 2 apparatus and system and imaged using the diffraction grating 72 onto optical detector 78 (assumed for the purposes of FIG. 6A to be a two-dimensional imaging array). The diffraction grating 72 splits the light corresponding to the portion 120 of the image 110 into separate color components. Each color component has an intensity determined by the presence of that color in the image portion 120, and by the location of that color in the image portion 120.

Waterfall plot 122 in FIG. 6A shows a representation of light intensity versus wavelength, indicated as a function of position (represented by the x-axis) along the image portion 120, and wavelength λ (represented by the wavelength dispersal axis, or λ-axis) of the light incident on the optical detector 78. The waterfall plot 122 of FIG. 6A shows energy peaks 123 associated with a red color component, and other energy peaks 124 associated with a green color component, where the objects 66 being imaged are strawberries.

Similarly, waterfall plot 132 of FIG. 6B shows a plot of the light intensity versus wavelength for a different set of objects 66, using data sampled from portion 130 of a different image 112. Waterfall plot 132 shows energy peaks 135 associated with an orange color component, where the objects 66 being imaged are oranges.

The spectral range of light source 60, diffraction grating 72, optical detector 78 and any other optical components (such as windows, lenses, and mirrors) is preferably determined by the spectral reflectivity characteristics of the objects 66 to be identified. For example, if the objects 66 have distinctive variations in their spectral response at certain wavelengths, possibly including visible, infrared, and ultraviolet wavelengths, then the system should employ as broad a range of wavelengths as needed for successful identification and classification of the objects 66.

Operation of a preferred object recognition system 37 (see FIG. 1) responsive to the image captured by optical detector 78 is described later herein. Various alternative embodiments for capturing a suitable image are first presented.

In one alternative embodiment, instead of using a two-dimensional detector array for optical detector 78, a one-dimensional detector array can be used for optical detector 78 in conjunction with a moving mirror (such as folding mirror 76), the one-dimensional detector array providing a first imaging axis, and the moving mirror providing a second imaging axis. In this alternative embodiment, one of the two axes is preferably aligned with the image of the objects 66 from the sampling slit 52, and the other of the two axes is preferably aligned with the wavelength dispersal axis from the diffraction grating 72, so that successive images from the one-dimensional detector array taken as the mirror 76 rotates can be combined to create a two-dimensional image of wavelength versus position, similar to the two-dimensional images used to create intensity plots 122 and 132 in FIGS. 6A and 6B.

Figure 15:
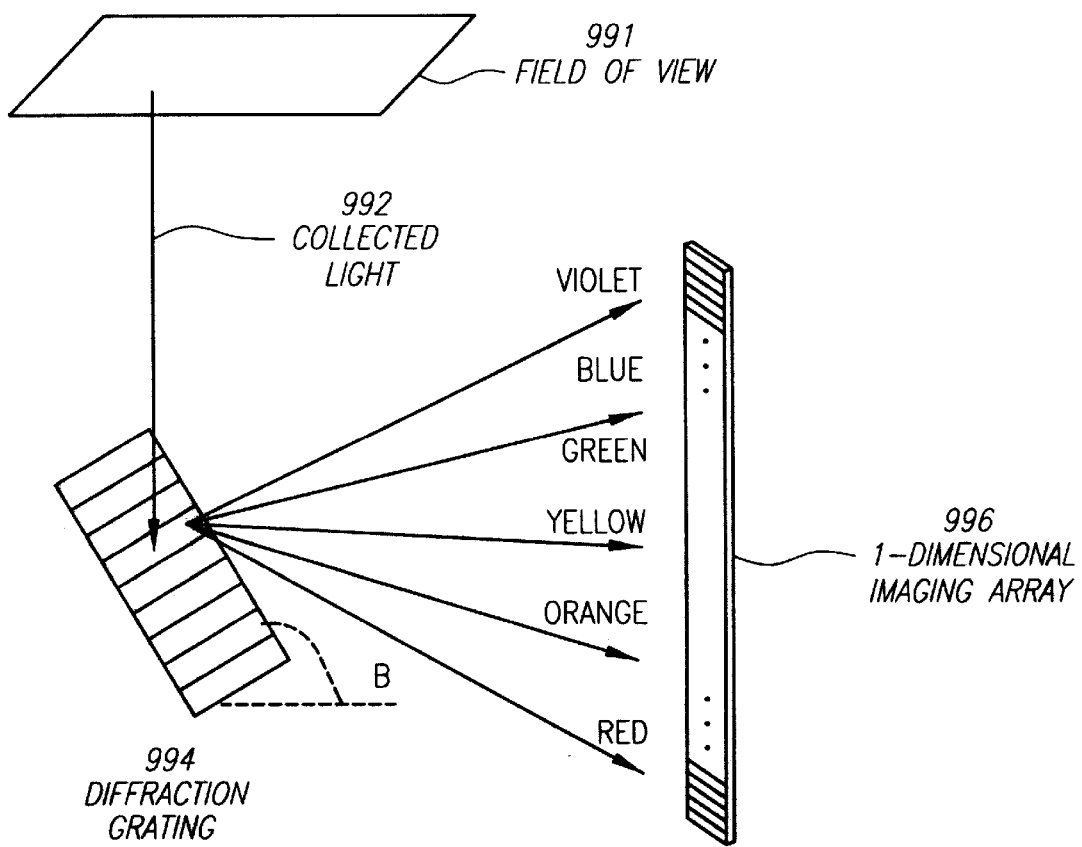
FIG. 15 depicts an alternative embodiment of a sensor apparatus using a one-dimensional detector array.

Another alternative embodiment using a one-dimensional detector array for optical detector 78, without the need for a rotating mirror, is shown in FIG. 15. In FIG. 15, a diffraction grating 994 receives collected light 992 over a relatively large field of view 991, and directs the light onto a one-dimensional imaging array 996. The one-dimensional imaging array 996 preferably has many pixels (e.g., 500 or 1000 pixels). In the FIG. 15 embodiment, the collected light 992 is spread out over a relatively wide area, thus allowing increased resolution over the λ-axis. However, the FIG. 15 embodiment does not utilize a positional axis to develop energy peaks corresponding to features of the object(s) to be recognized. Thus, the FIG. 15 embodiment provides color composition information, but not spatial information. Due to the length of the linear pixel array, the color composition information provides increased color resolution, which can be beneficial in some object recognition environments, particularly where spatial information is not as necessary. The larger the field of view 991, the greater the size of the image from which the color components are derived.

Figure 3:
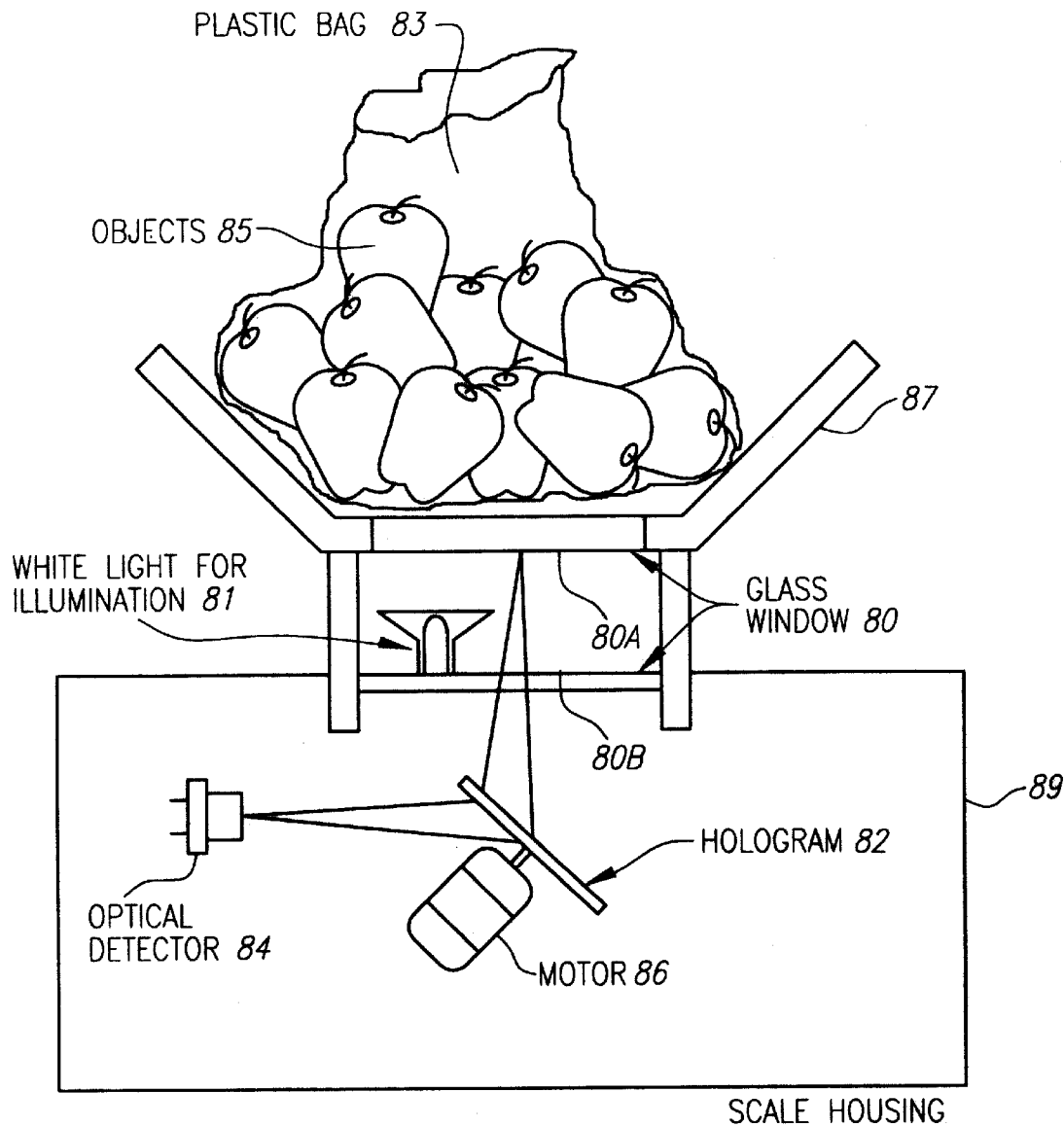
FIG. 3 is a diagram of a portion of a system for measuring the spectral profile of an object or a set of objects using a holographic disk.

Another embodiment of an apparatus and system for object recognition detects the spectral response of objects by using a rotatable holographic disk, and is shown in FIG. 3. The apparatus and system of FIG. 3 comprises a weighing pan 87 (similar to weighing pan 50 of FIG. 2), and an enclosure 89 in which is housed a scale mechanism (not shown) and various components of the object recognition system. A light source 81 is directed towards a glass window 80*a* in the bottom of the weighing pan 87. Another glass window 80*b* is located in the top of the enclosure 89. A holographic disk 82 is located below the glass window 80*b* along a line-of-sight from the center of the weighing pan 87. A motor 86 is connected to the holographic disk 82. An optical detector 84 is positioned within the enclosure 89. The holographic disk 82 is preferably positioned at an angle so as to direct light passing through window 80*b* onto the optical detector 84.

In operation, holographic disk 82 is rotated by motor 86 to provide spectral selectivity, focus collected light onto detector 84, and to "scan" the viewpoint of optical detector 84 across objects 85 placed atop the weighing pan 87. The light source 81 provides illumination in the form of white light which is reflected from the objects 85 and then passes through windows 80*a–b*. After passing through windows 80*a–b*, the reflected light is directed through the rotating holographic disk 82 and onto an optical detector 84, which is preferably embodied as a linear imaging array (such as a linear CCD array).

The holographic disk 82 is designed with multiple facets, each facet designed to direct light within a certain wavelength at a specified angle, according to well known techniques as described, for example, in L. Dixon and G. Sincerbox, "Optics and Holography in the IBM Supermarket Scanner," *Advances in Laser Scanning Technology, SPIE Proceedings*, Vol. 299 (August 1981), at pp. 163–68; H. Ikeda et al., "Shallow-Type Truncated Symbol Reading Point-of-Sale Hologram Scanner," *Applied Optics*, Vol. 24, No. 9 (May 1, 1985), at pp. 1366–70; and G. Sincerbox, "Holographic Scanners; Applications, Performance and Design", printed in G. Marshall (ed.), *Laser Beam Scanning* (Marcel Dekker Inc.), each of which is hereby incorporated by reference as if set forth fully herein. As each facet on the holographic disk 82 moves into position, light reflected from the objects 85 which is within the wavelength band corresponding to that facet is collected and directed onto the optical detector 84. As the facet rotates, light from successive areas of the objects 85 is collected and directed onto the optical detector 84. The optical detector 84 in response thereto produces an output signal corresponding to the intensity of the collected light for that wavelength band at each position along the scan path.

When the next facet of the holographic disk 82 moves into position, the "scanning" process is repeated along the same path for the wavelength band associated with the new facet. This process continues for each facet until the holographic disk 82 has completed a revolution. Using rotational position data provided by the drive circuits for motor 86 or an associated shaft angle encoder to indicate the angular position of the holographic disk 82, the identity of the current facet and the current position along the scan path can be determined, allowing the intensity data from optical detector 84 to be plotted as spectral response versus position data similar to waterfall plots 122 and 132 of FIGS. 6A and 6B.

The quality of the wavelength information (such as shown in wavelength plots of FIGS. 6A and 6B) to some degree depends on the uniformity and quality of the light provided by the light source (e.g., light source 60 in FIG. 2, or light source 81 in FIG. 3). Variations in the light source may lead to variations in the nature of the light detected by the optical recognition system; thus, a constant intensity light source over the desired range of wavelengths is preferred. It can be difficult, however, to provide a practical, low cost white light source having a constant intensity illumination spectrum over the desired range of wavelengths. It can also be difficult to provide a light source having only a very small amount of variation in intensity and spectral profile from one unit to another.

To avoid these practical limitations, the apparatus and system of FIG. 2 or FIG. 3 preferably comprises means for normalizing the response of the optical signal prior to analysis of the optical signal by the object identification unit. Thus, when using a white light source, the object recognition system 30 (see FIG. 1) preferably comprises a lookup correction table 39 (FIG. 1) listing correction factors for each wavelength of interest. The correction factors are applied to the optical signal 35 before the optical signal 35 is analyzed by the pattern recognition system 37 for object recognition and classification. Each correction factor is generally a simple scaling factor which is applied by multiplying the measured reflected light intensity at some wavelength by the correction factor stored in the lookup correction table 39 for that wavelength.

For example, a certain white light source may provide an output power level P1 at wavelengths in the green portion of the spectrum, but only provide eighty percent of that output power level at wavelengths in the blue portion of the spectrum. Taking the output level P1 for green as the reference, the correction factor C1 for green would be 1.0, and the correction factor C2 for blue would be 1.0÷0.8=1.25. After the reflected light values are measured by the optical detector, but before performing the object classification process, the green values are left changed (or, equivalently, are multiplied by C1, or 1.0), but the blue values are multiplied by the correction factor of C2, or 1.25.

If the object recognition system uses controllable fluorescent lighting for the light source, then the lamps may be left normally on and switched off for only a few cycles of the AC power line in order to gather baseline information. During the lamp off period, the lamp cathode current may be increased to keep the cathodes up to temperature and minimize degradation of the cathodes upon restart.

Figure 4:
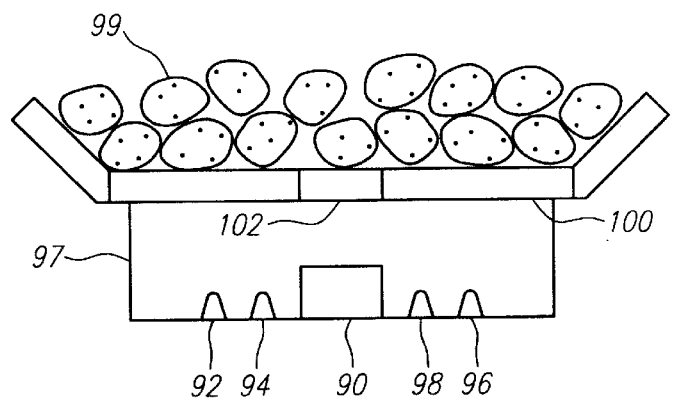
FIG. 4 is a diagram of a portion of a system for measuring the spectral profile of an object or a set of objects using narrowband emitters at several different wavelengths.

Another alternative embodiment of a system and apparatus for acquisition of color information and object recognition is shown in FIG. 4. In the FIG. 4 system and apparatus, spectral response is generally measured by using several narrowband illumination sources to illuminate a target. The FIG. 4 system and apparatus comprises a weighing pan 100

(similar to weighing pan 50 of FIG. 2) mounted atop an enclosure 97. An optical detector 90 is positioned within the enclosure 97. A plurality of narrowband illumination sources 92, 94, 96, 98 are positioned to either side of the optical detector 90. Weighing pan 100 may be transparent, or alternatively, may be opaque and provided with transparent aperture 102 which is sized to not interfere with the field of view of optical detector 90.

Figure 5:
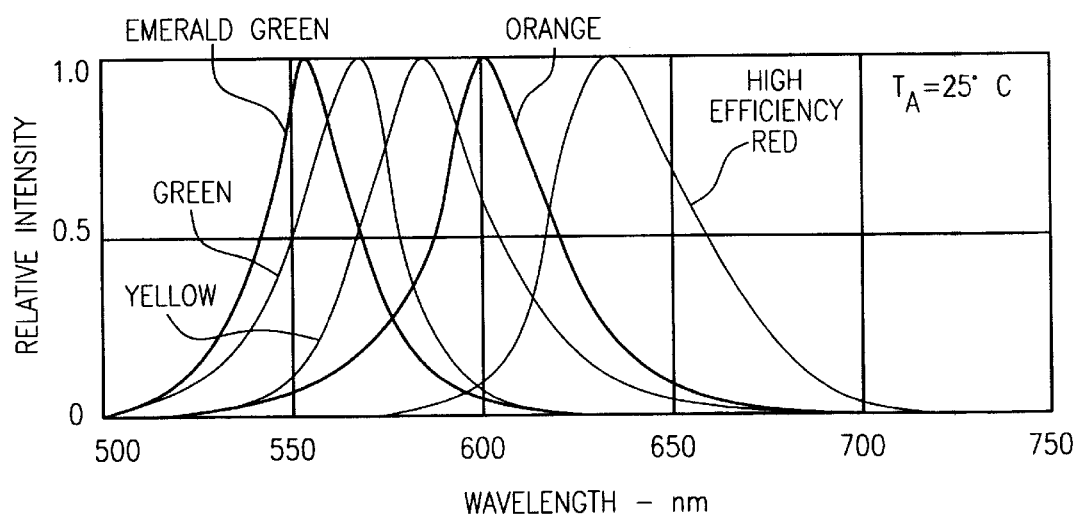
FIG. 5 is a graph of relative spectral response curves for light emitting diodes at several different wavelengths of light.

The narrowband illumination sources 92, 94, 96 and 98 each operate at a different wavelength or over a different wavelength band. Preferably, light emitting diodes (LEDs) are used as the narrowband illumination sources 92, 94, 96, and 98, since LEDs generally have a long usable life, high efficiency, small size, and are available in a variety of different wavelengths. Exemplary available wavelengths of LEDs from one manufacturer (Hewlett-Packard Corp.) are shown in FIG. 5. LEDs having characteristics or using wavelengths other than those shown in FIG. 5 may be used as well; for example, LEDs may be employed which use various infrared wavelengths. Many other types of light emitters may be used besides LEDs, including various types of lasers.

The narrowband illumination sources (e.g., LEDs) 92, 94, 96 and 98 are activated time-sequentially in series, so that only one LED (or group of LEDs of the same color) is active at a time. Thus, the object(s) 99 to be recognized are illuminated by only one wavelength band of light (as shown, for example, by the peaks in FIG. 5) at a time, allowing the optical detector 90 to capture an image showing the reflectivity of the objects 99 at that wavelength band. Because only one wavelength band of light is operative at a given time, the optical detector 90 need only be a one-dimensional (i.e., linear) detector array, and its output signal comprises a one-dimensional image. Each narrowband illumination source 92, 94, 96 and 98 is operated sequentially in turn, and a one-dimensional image is thereby captured at each wavelength band. When combined, the one-dimensional plots provide data similar to that shown in the waterfall plots 122 or 132 of FIGS. 6A and 6B.

As an alternative to using a one-dimensional detector array for optical detector 90, a single photo-detector cell can be used in conjunction with a moving mirror to scan a field of view across the objects 99 to form a one dimensional image at each wavelength band.

A variation of the FIG. 4 embodiment may be utilized to measure and analyze average spectral characteristics within an area of the objects 99. In this variation, the optical detector 90 is embodied as a single photo-detector cell which views objects through a transparent aperture 102 located in an opaque weighing pan (or plate) 100. The intensity of reflected light from the objects 99 above the transparent aperture 102 for each narrowband illumination source 92, 94, 96, 98, operated in time-sequential fashion, is measured by detector 90. Preferably, in this alternative embodiment the aperture 102 provides a wide field of view, so that the optical detector 90 obtains an average spectral characteristic for each wavelength band for a large part of the object being imaged. Intensity versus wavelength information is used as part of the object recognition and classification process described hereafter. Because an "average" spectral characteristic is obtained, spatial information is not determined using this alternative embodiment. However, this embodiment has the advantage of using a very simple optical detector (i.e., a single photo-cell) and of requiring no rotating mirror or other moving parts in the optics.

Once an image including color information is captured, by use of, e.g., any of the FIG. 2, 3 or 4 embodiments, the image is processed to identify the objects from which the image was taken. For this purpose, the optical recognition system 30 comprises a pattern recognition system 37, and a database 36 of prestored images. In general, to identify and classify objects, spectral response data, object size and texture data from an unknown object may be compared to data previously stored from representative known objects. In the preferred embodiment, this comparison is done by a programmed computer that is a part of the pattern recognition system 37. Both color and size information are utilized in the pattern recognition process.

Examples of pattern recognition may be explained with respect to the waterfall plots of FIGS. 6A and 6B. In FIG. 6B, waterfall plot 132 from oranges shows energy peaks 135 in the orange color band only. The width of the energy peaks 135 determined by the size of the individual oranges. This data is easily distinguished from the data of waterfall plot 122 generated from strawberries, which shows energy peaks 123, 124 in the red and green color bands. The width of the energy peaks 123 correspond to the sizes of the strawberries, and the width of energy peaks 124 correspond to the stems of the strawberries.

In the examples of FIGS. 6A and 6B, both the color information and the size information are distinguishing features which assist in the identification of the objects. Once waterfall plots 122 and 132 have been generated a first time, unknown objects may be classified as oranges or strawberries based on the degree of similarity to either plot 132 or plot 122. Allowance is preferably made for variation in the quantity of objects, and therefore the number of energy peaks at each color band which may be present, and also to the possibility of overlapping energy peaks when objects are adjacent to each other. Variations in intensity within each energy peak are also useful in distinguishing objects, as these variations are indicative of the texture of an object.

Figure 16A:
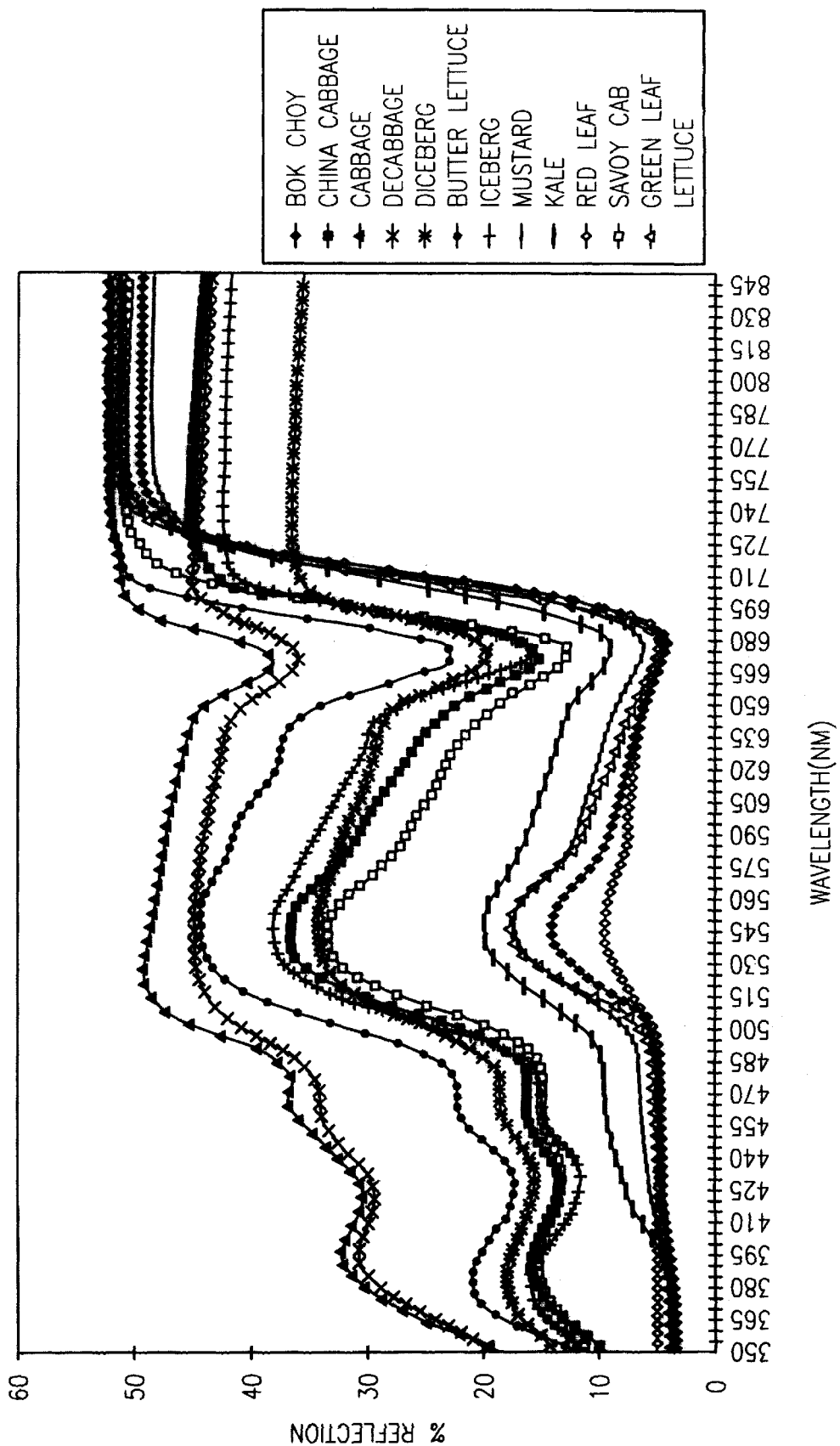
FIGS. 16A and 16B are graphs of reflection characteristics for different types of produce.
Figure 16B:
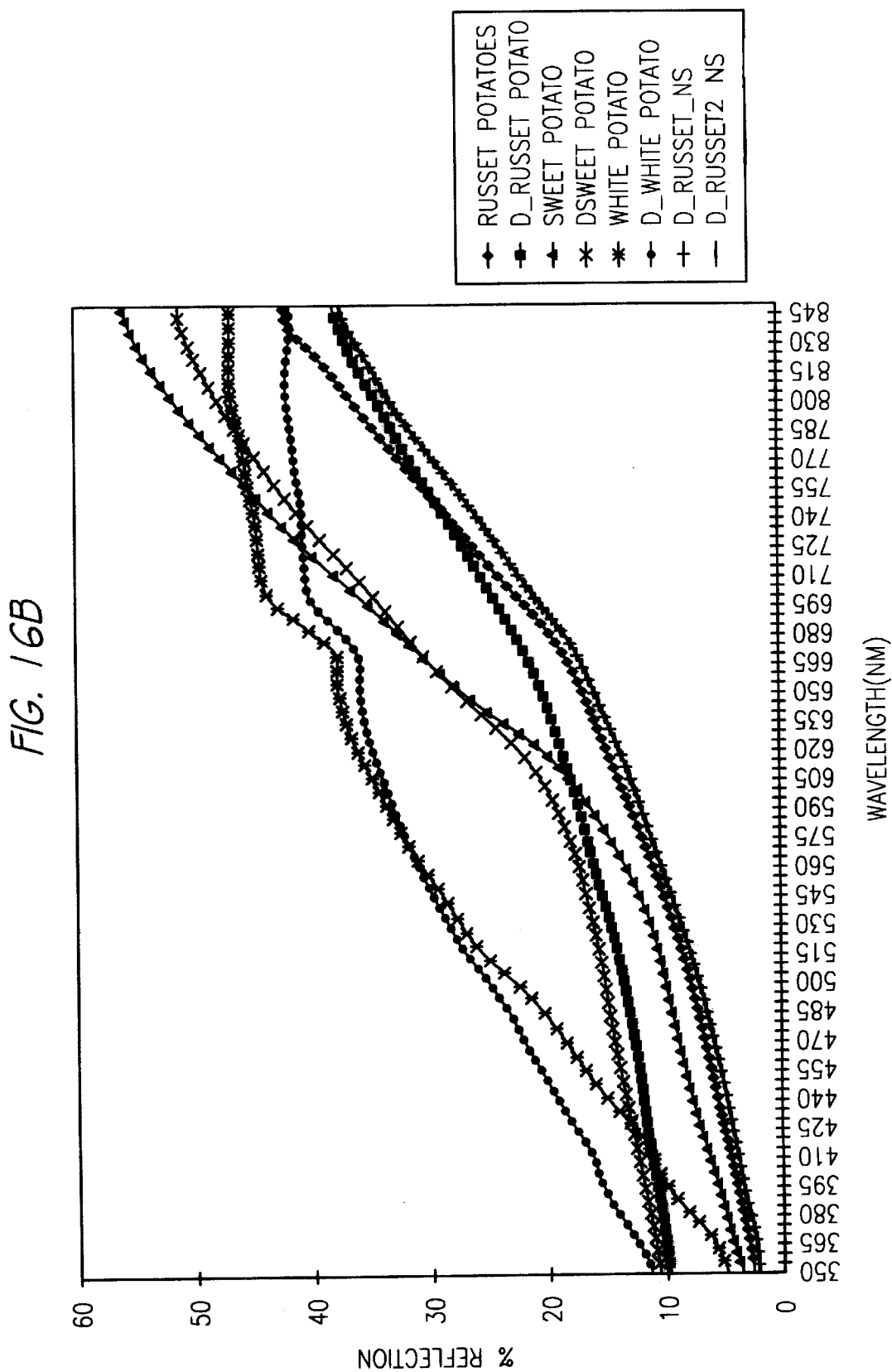

FIGS. 16A and 16B are graphs illustrating the similarities and differences of reflection characteristics for different types of produce. FIG. 16A shows reflection characteristics for various green vegetables, and FIG. 16B shows reflection characteristics for various root vegetables. The graphs of FIGS. 16A and 16B illustrate how the relative intensity of the reflection (i.e., the "reflectivity") of the various types of produce varies with respect to wavelength of the light being detected (i.e., by an optical detector). The different wavelengths of light depicted in FIGS. 16A and 16B correspond to different colors of the light spectrum. The pattern recognition system 37 may store information such as found in the graphs of FIGS. 16A and 16B to facilitate the object recognition process.

The pattern recognition system 37 may make use of well known pattern recognition algorithms to classify unknown objects into classes based on the previously measured characteristics of known objects. For example, a nearest neighbor classification method can be used, wherein (a) data values describing characteristics of an unknown object are measured (for example, the spectral response characteristics such as shown in waterfall plots of FIGS. 6A and 6B, along with any other characteristics of the unknown object); (b) the data values are used as coordinates to define the object in a multidimensional feature space; (c) data values describing characteristics of known items are mapped into the feature space; (d) the data values defining the unknown item are mapped into the same feature space; (e) the distance between the unknown item and each known item is computed separately for each known item according to any suitable template matching technique in multi-dimensional space; and (f) the unknown item is classified based on, for example, the closest known item (i.e., shortest distance) in the feature space.

Figure 14:
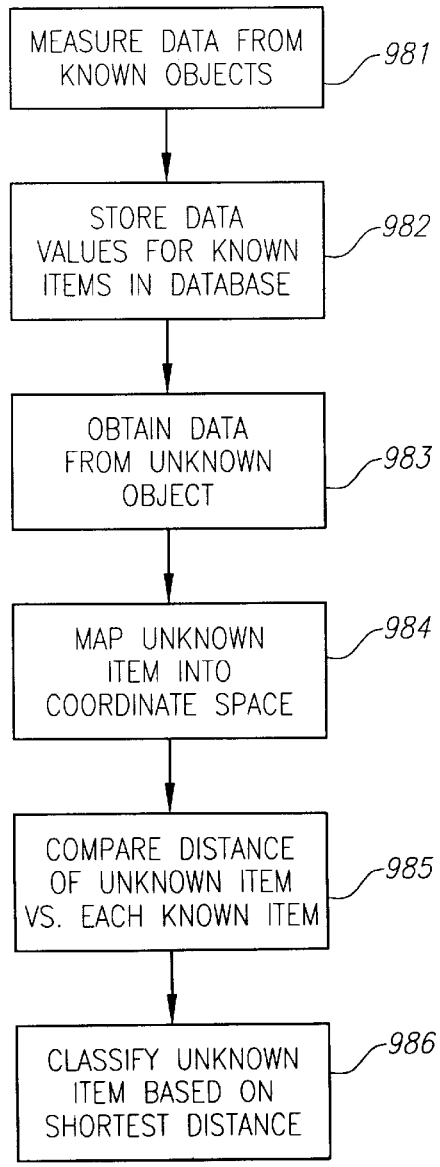
FIG. 14 is a chart illustrating the steps of a nearest neighbor classification method in accordance with an illustrative embodiment for recognizing patterns.

The pattern recognition system 37 preferably stores predefined images in a database 36 "library" of prestored images. When an image of the unknown object is captured, the pattern recognition system 37 references the prestored images in the database 36 to perform the pattern recognition process. Exemplary steps for a nearest neighbor classification method for pattern recognition such as carried out by pattern recognition system 37 are illustrated in FIG. 14. These steps are as follows:

(a) in a first step 981, data values describing characteristics from known items are obtained by any suitable means, including any of the measurement means described herein, such characteristics including, for example, the spectral response characteristics such as shown in waterfall plots of FIGS. 6A and 6B, along with any other characteristics of the unknown object, and also including, if desired, any or all of the weight, volume, footprint, density, or pseudo-density of the known items;

(b) in a next step 982, the data values of the known objects are stored in a database (such as database 36), to build up a "library" of stored images against which an unknown object may be compared;

(c) in a next step 983, data values describing an unknown object are measured by any suitable means, including any of the means described herein, such characteristics including, for example, the spectral response characteristics such as shown in waterfall plots of FIGS. 6A and 6B, along with any other characteristics of the unknown object, and also including, if desired, any or all of the weight, volume, footprint, density, or pseudo-density of the known items, to obtain the same type of characteristics as are stored for the known items in the database;

(d) in a next step 984, the data values defining the unknown item are mapped into a multidimensional feature space, with the dimensions of the feature space corresponding to the characteristics measured for the unknown item (thus, the measurement of the known item may use less than all of the potentially available dimensions stored in the database);

(e) in a next step 985, the data values defining each known item are mapped into same multi-dimensional feature space, and the distance between the unknown item and each known item is calculated; and (f) in a next step 986, the unknown item is classified based, for example, on the closest known item in the multi-dimensional feature space.

Suitable pattern recognition algorithms for template matching within a multi-dimensional space are described in references on the subject, including J. Bezdek and S. Pal (eds.), *Fuzzy Models for Pattern Recognition* (IEEE Press 1992), and various articles in the *Proceedings of the 1993 World Congress on Neural Networks* (INNS Press 1993), both of which are incorporated by reference as if set forth fully herein.

Figure 8:
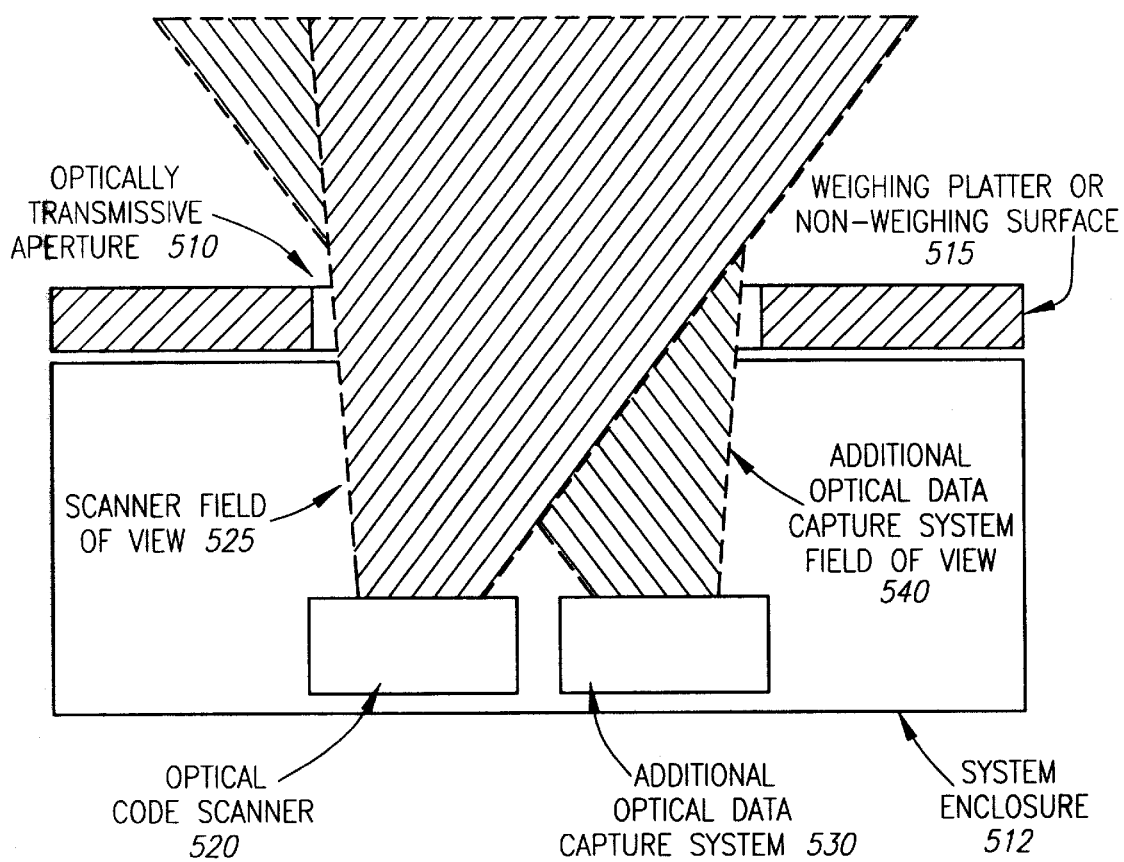
FIG. 8 is a diagram of an apparatus for object identification including co-existing optical code reader and an additional data capture system.
Figure 9:
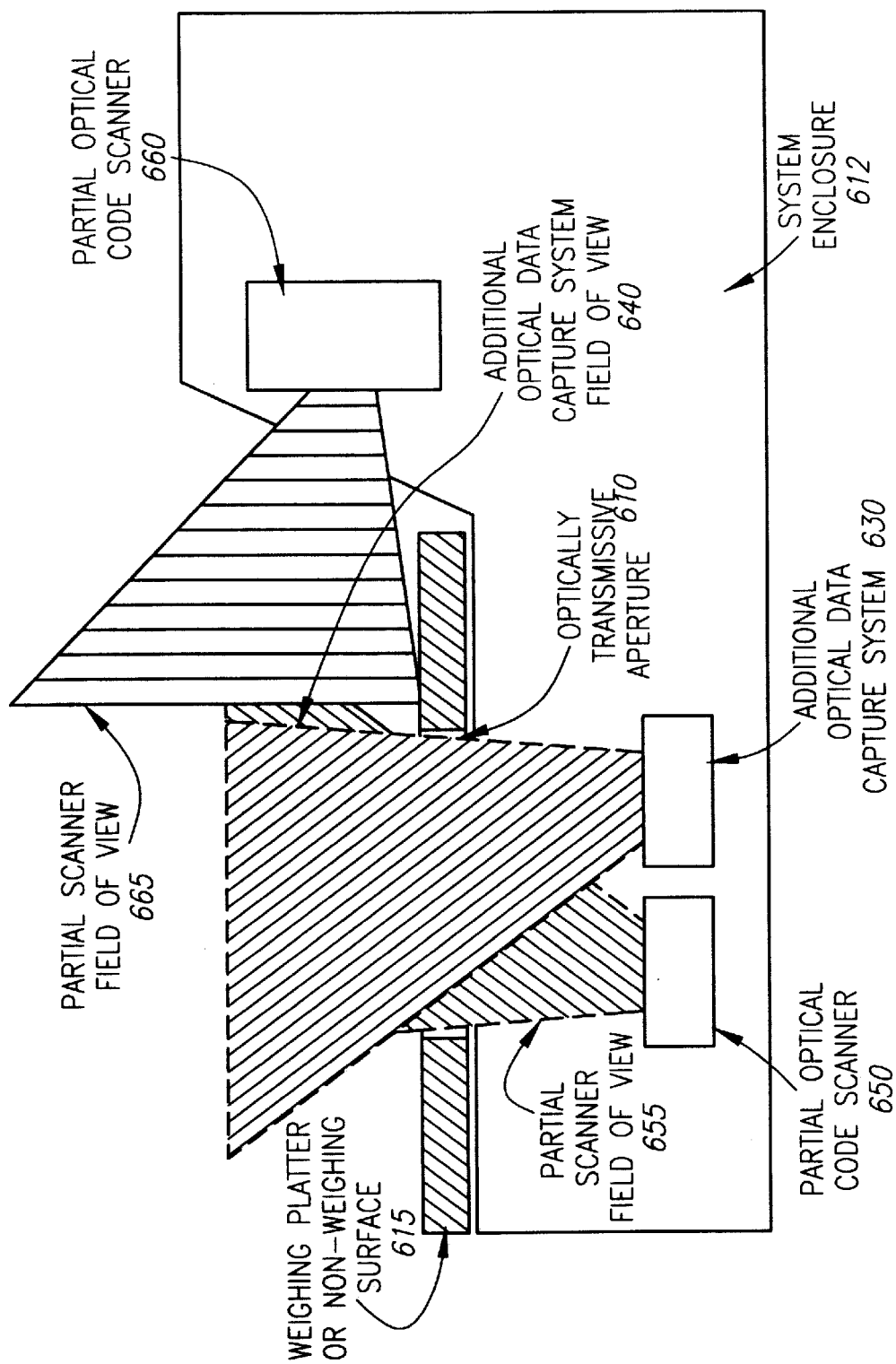
FIGS. 9 and 10 are diagrams of different embodiments an apparatus for object identification including co-existing optical code reader having multi-planar imaging capability and an additional data capture system.
Figure 10:
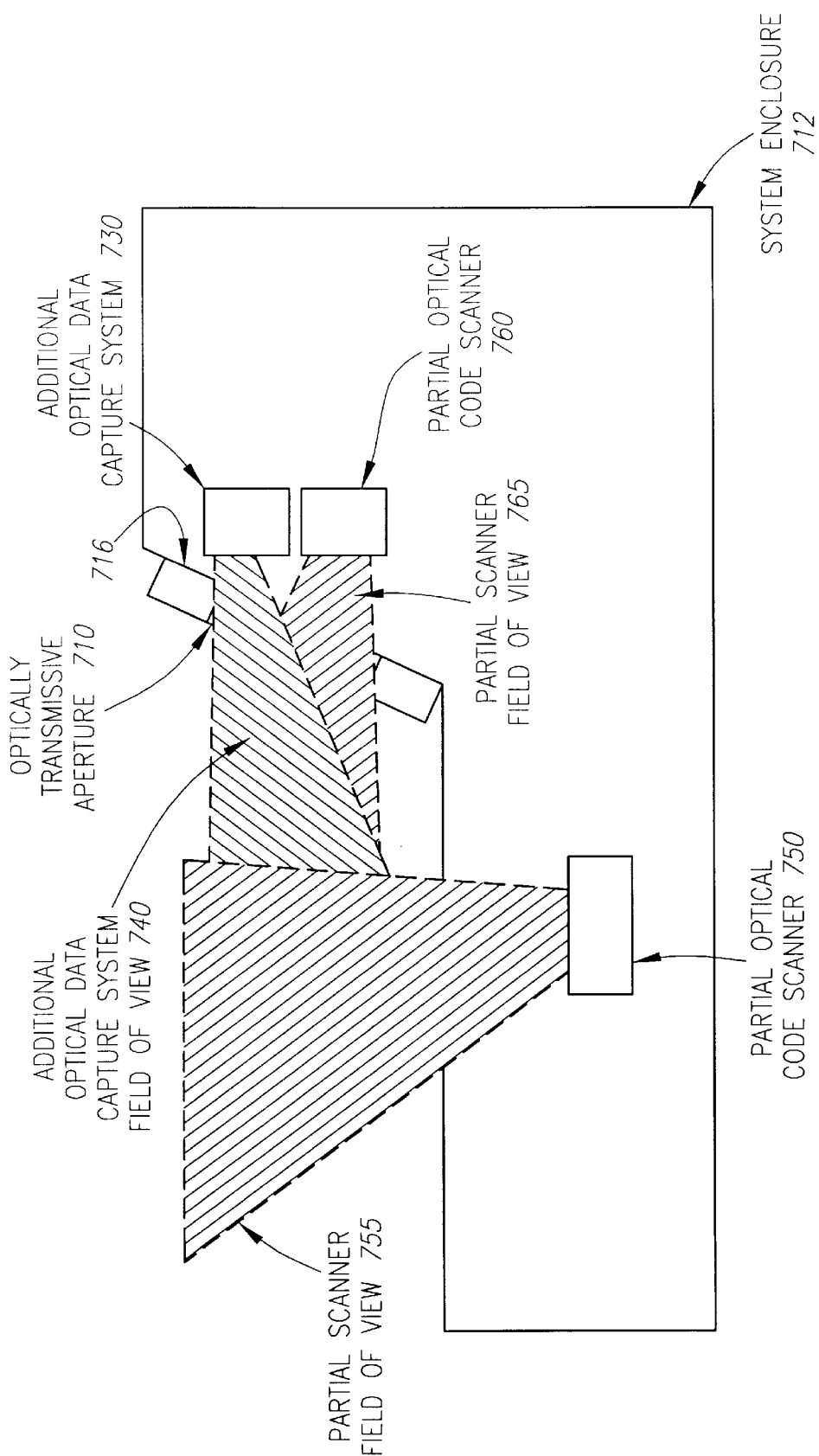
Figure 11:
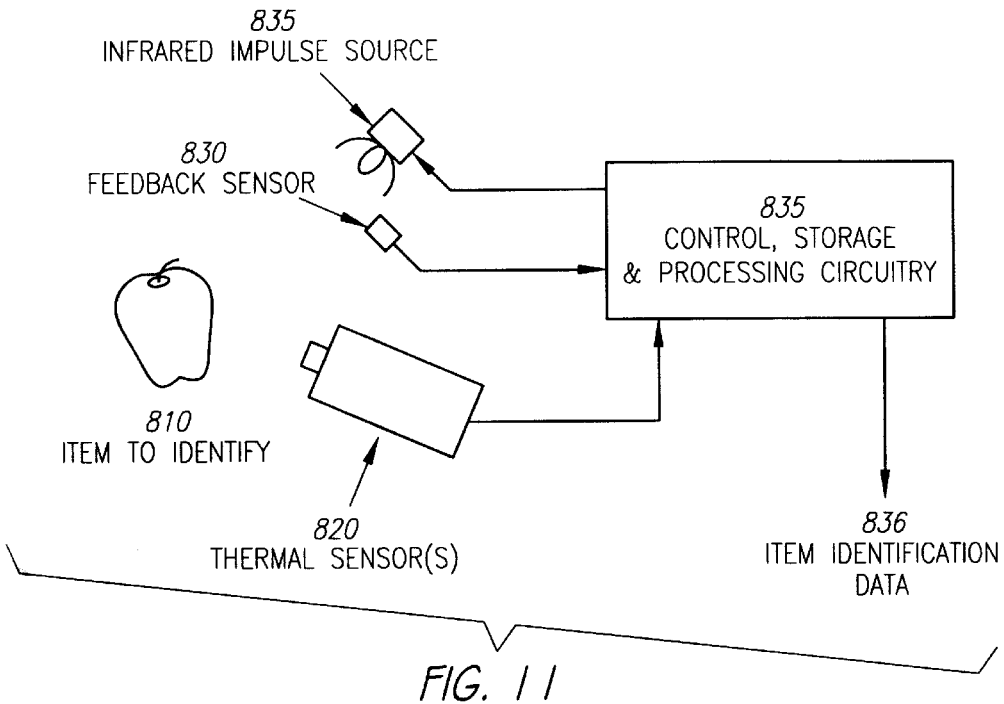
FIG. 11 is a diagram of an alternative embodiment using differential thermal characteristics for object recognition.
Figure 12:
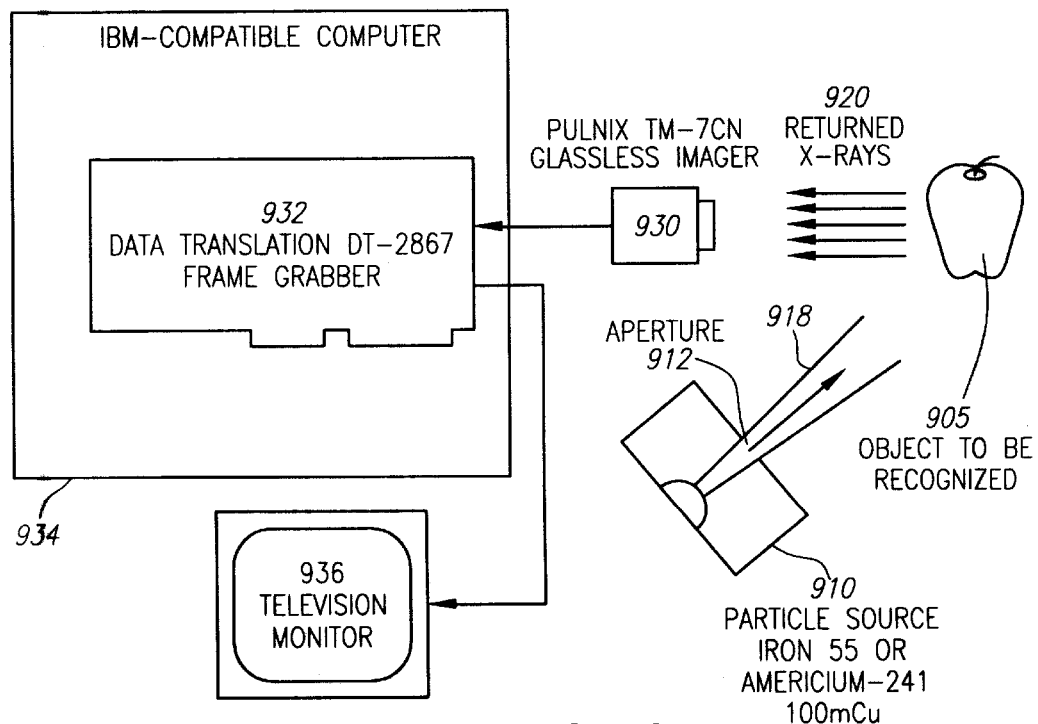
FIG. 12 is a diagram of an alternative embodiment using a particle source and a secondary emission sensor for object recognition.
Figure 13:
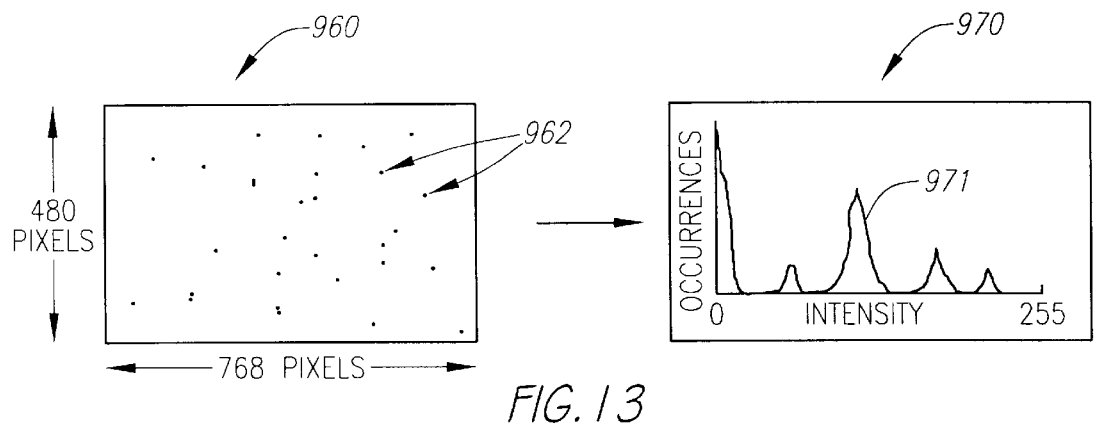
FIG. 13 is a diagram showing conversion of a pixel data collected by the secondary emission sensor of FIG. 12 to histogram data.

FIGS. 8, 9 and 10 are diagrams of alternative systems including both a reader configured to read optical codes and an object recognition system (such as the object recognition system 30 of FIG. 1, or the object recognition systems making use of infrared or low-level radiation emissions described hereafter with respect to FIGS. 11–13).

FIG. 8 is a horizontal surface embodiment wherein the optical code imaging plane and the object recognition sensing region emanate through the same window or slit. In FIG. 8, a weighing platter 515 (or, alternatively, a non-weighing surface) is mounted atop an enclosure 512. The weighing platter 515 has an optically transmissive aperture 510 (e.g., a window or other transparent opening), which allows scanning or imaging by an optical code reader 520 and an additional data capture system 530 (such as an object recognition system). Items either capable of being recognized or bearing optical codes are presented over the weighing platter 515 within the fields of view of the optical code reader 520 and the additional data capture system 530, or are placed atop the weighing platter 515 over the optically transmissive aperture 510. The weighing platter 515 can thereby measure the weight of the item at the same time as the image processing or other data gathering function.

Optical code readers such as bar code scanners are well known and various principles thereof are described, for example, in U.S. Pat. Nos. 5,202,784, 5,296,689, and 5,371,361, each of which is hereby incorporated by reference as if set forth fully herein. An exemplary combined scanner and scale is disclosed and described in, for example, U.S. Pat. No. 5,410,108, which is hereby incorporated by reference as if set forth fully herein.

The optically transmissive aperture 510 provides an opening (or window) in common to the optical code reader 520 and additional data capture system 530, allowing the field of view 525 of the optical code reader 520 and the field of view 540 of the additional data capture system 530 to exit the top surface of the weighing platter 515. The system may be configured with the fields of view 525, 540 oriented in any direction desired.

In a preferred embodiment, the additional data capture system 530 comprises an optical property measuring device, such as an object recognition system (such as that of FIG. 1), or alternatively, any of a number of video camera-based item recognition systems as are known in the art. In this embodiment, the additional optical data capture system 530 views the item to be identified through the same optically transmissive aperture 510 used by the optical code reader 520 (which may be a combined reader/scale). This configuration allows the co-existence of the optical code reader 520 and the additional data capture system 530, by the sharing of the optically transmissive portion between the two systems, thereby resulting in a reduction of space required and economies of shared components. Further, an operator using the FIG. 8 device at a checkstand need not move items from one data collection surface to another.

The shared surface in which the optically transmissive aperture 510 is located need not be a horizontal surface, but may be inclined at any suitable angle, including a substantially vertical angle, depending on the physical system architecture and the packaging needs of the system.

In another embodiment, the additional data capture system is configured so as to co-exist with a multi-plane optical code reader, such as shown in FIG. 9. In the FIG. 9 embodiment, two partial optical code readers 650 and 660 are used to obtain multi-planar data capture. Similar to FIG. 8, a weighing platter 615 (or, alternatively, a non-weighing surface) is mounted atop an enclosure 612 (which is different than enclosure 512 of FIG. 8, so as to accommodate partial optical code reader 660). The weighing platter 615 has an optically transmissive aperture 610, which allows scanning or imaging by partial optical code reader 650 and an additional data capture system 630 (such as an object recognition system). Items either capable of being recognized or bearing optical codes are presented over the weighing platter 615 within the fields of view of the partial optical code reader 650 and the additional data capture system 630, or are placed atop the weighing platter 615 over the optically transmissive aperture 610. The weighing platter 615 can thereby measure the weight of the item at the same time as the image processing or other data gathering function.

The optically transmissive aperture 610 provides an opening (or window) in common to the partial optical code reader 650 and additional data capture system 630, allowing the "partial" field of view 655 of the partial optical code reader 650 and the field of view 640 of the additional data capture system 630 to exit the top surface of the weighing platter 615. Partial optical code scanner 660 is used to image the vertical plane, and has a "partial" field of view 665 which exits through a different aperture than the optically transmissive aperture 610 shared by the other two data gathering devices. The system may generally be configured with the fields of view 625, 640 and 665 oriented in any direction desired, with partial fields of view 625 and 665 preferably arranged to provide multi-planar reading capability.

In a preferred embodiment, the additional data capture system 630 comprises an optical property measuring device, such as an object recognition system (e.g., the object recognition system of FIG. 1), or alternatively, any of a number of video camera-based item recognition systems as are known in the art. In this embodiment, the additional optical data capture system 630 views the item to be identified through the same optically transmissive aperture 610 used by partial optical code reader 650 (which may be a combined reader/scale). Similar to the FIG. 8 embodiment, the FIG. 9 configuration allows the co-existence of the partial optical code reader 650 and the additional data capture system 630, by the sharing of the optically transmissive portion between the two systems, thereby resulting in a reduction of space required and economies of shared components. Further, as with the FIG. 8 embodiment, an operator using the FIG. 9 device at a checkstand need not move items from one data collection surface to another.

Another embodiment in which an additional data capture system is configured so as to co-exist with a multi-plane optical code reader is shown in FIG. 10. Possible configuration for a multi-plane optical reader are described in U.S. Pat. No. 5,475,207, herein incorporated by reference. In the FIG. 10 embodiment, two partial optical code readers 750 and 760 are used to obtain multi-planar data capture. A weighing platter (not shown) or, alternatively, a non-weighing surface, may be mounted atop an enclosure 712 above the partial optical code reader 750. On a vertical, or substantially vertical, wall 716 of the enclosure 712 is an optically transmissive aperture 710, which allows scanning or imaging by partial optical code reader 760 and an additional data capture system 730 (such as an object recognition system). Items either capable of being recognized or bearing optical codes are presented within the fields of view of the partial optical code readers 750, 760 and the additional data capture system 730 (or are placed on the weighing platter, if provided, thereby allowing the weighing platter to measure the weight of the item at the same time as the image processing or other data gathering function).

The optically transmissive aperture 710 provides an opening (or window) in common to the partial optical code reader 760 and additional data capture system 730, allowing the "partial" field of view 765 of the partial optical code reader 760 and the field of view 740 of the additional data capture system 730 to exit the vertical (or substantially vertical) surface of the enclosure 712. Partial optical code scanner 750 is used to image the horizontal plane, and has a "partial" field of view 755 which exits through a different aperture than the optically transmissive aperture 710 shared by the other two data gathering devices. The system may generally be configured with the fields of view 740, 755 and 765 oriented in any direction desired, with partial fields of view 755 and 765 preferably arranged to provide multi-planar reading capability.

In a preferred embodiment, the additional data capture system 730 comprises an optical property measuring device, such as an object recognition system (e.g., the object recognition system of FIG. 1), or alternatively, any of a number of video camera-based item recognition systems as are known in the art. In this embodiment, the additional optical data capture system 730 views the item to be identified through the same optically transmissive aperture 710 used by partial optical code reader 765. Similar to the FIG. 8 or 9 embodiments, the FIG. 10 configuration allows the co-existence of the partial optical code reader 765 and the additional data capture system 730, by the sharing of the optically transmissive portion between the two systems, thereby resulting in a reduction of space required and economies of shared components. Further, as with the FIG. 8 or 9 embodiments, an operator using the FIG. 10 device at a checkstand need not move items from one data collection device to another.

In a variation of the FIG. 10 embodiment, the vertical (or substantially vertical) wall 716 also comprises a weighing platter.

In a multi-plane reader such as shown in FIG. 9 or FIG. 10, the shared optical surface may be either substantially vertical or substantially horizontal, or at some other angle if desired, or there may be more than one shared optical surface. The additional data capture system (530, 630 or 730 in FIGS. 8, 9 and 10, respectively) may also have multiple viewing directions and angles, and may make use of multiple apertures. If optical in nature, illumination for the additional data capture system may be provided through the same aperture or apertures used to collect light for the optical code reader, or ambient light may be used where, for example, techniques are employed such as those described in U.S. patent application Ser. No. 08/363,258 filed Dec. 23, 1994, and hereby incorporated by reference as if set forth fully herein.

The additional data capture system (530, 630 or 730 in FIGS. 8, 9 and 10, respectively) may, as noted, be an object recognition system such as shown, for example, in FIG. 1. The FIG. 1 object recognition system 30 employed in the FIG. 8, 9 or 10 embodiments could be used for automatic identification of produce items in a grocery store, or of miscellaneous nonlabelled items (i.e., items without a bar code label or other optical code affixed thereto) in grocery or non-grocery retail environments.

For items with standard weights, such as, for example, nails or screws, an item count can be obtained by using a combination of a product weight derived from a scale and recognition information derived from the additional data capture system and/or optical code reader. Once the product is recognized, the standard weight can be looked up from an internal table, and the measured weight divided by the standard item weight to arrive at the item count.

Object weight, size, shape, color, density, "pseudo-density" and similar information may also be utilized as further clues to assist in the object recognition process. The system may make use of a pressure sensitive surface to measure contact area of an item in order to calculate item size and shape. Alternatively, item shape and size may be estimated from a video image. Object volume can be calculated from multiple images captured from multiple points of view, or from using multiple images of an object moving relative to the imager (e.g., camera). Object density can be calculated from object volume and weight measurements. Using information from a single point of view, the footprint of an object on an image aperture can be measured, and a pseudo-density calculated by taking the ratio of the object weight to the area of the item footprint on the aperture or window. Each of these measurements may be used to further assist in the object recognition process.

The object recognition system may also make use of video or other information from the optical code reader, to the extent such information is available.

In an alternative embodiment utilizing an automated or semi-automated checkout system, a transparent belt moves items to be identified by an integrated object recognition and optical reading system. If the object recognition system uses a video camera, then the camera may be adjusted in or out-of-focus in order to gain additional information or to filter optical noise.

A variety of object recognition systems as known in the art may be employed as the additional data gathering system in FIGS. 8, 9 or 10. Some such object recognition systems may use, for example, a color video camera to obtain color information, or a monochrome camera with field-sequential color filter switching.

For color video imaging systems, color drift may present a problem. Color balance may be maintained through compensation techniques in the imaging system by imaging a color reference on a portion of the imaging array. In this embodiment, the color reference comprises a material having a known color composition that is positioned within the field of view of the color video imaging system. The color reference receives the same illumination as the item to be recognized, and is imaged onto a predefined portion of the imaging array. The output signal from that portion of the imaging array is used by the system to monitor, for example, lighting conditions, and color drift caused by variations in lighting or changing characteristics of the color imaging array (due to, e.g., temperature or other factors). The system makes use of this measurement to compensate for or correct color drift using a conventional feedback loop.

In color video systems, or in other data gathering systems collecting color information, the large amount of data to be captured for a complete image can present a storage problem. To reduce the amount of storage required, the system need not make use of complete stored color images, but rather may process information in essentially real time by utilizing one or more color histograms associated with a captured image. For example, where each pixel has multiple color components, such as red, green, and blue (RGB) components, a color histogram is generated by evaluating the intensity of the colors in each pixel read, and building the histogram based on the color intensities of those colors for all the pixels read. The completed histogram reflects the color distribution of the object to be identified. The color histogram may be compared against prestored color histograms associated with known objects to classify the object to be identified, by essentially matching color distributions of the read object and the stored objects. By not storing an entire color image before processing, the amount of processing, memory and power requirements may be reduced greatly. The system may make use of a linear multi-color sensor array or it may convey the optical information to several color detectors by means of optical fibers.

The additional data capture system may comprise a video camera based system which is used to evaluate checker or operator ergonomics. The camera and its associated system could examine and report on body motions of the operator. Similarly, the additional optical data capture system may be a video camera based system which is used as a surveillance device to observe operator theft. The video output from the integrated camera and optical code reader system could be connected to the surveillance system of a retail store.

FIG. 11 is a diagram of an alternative embodiment using differential thermal characteristics for object recognition, by itself or in conjunction with other object recognition means. The system of FIG. 11 is particularly useful where items are not easily labelled with a bar code or otherwise to facilitate their identification upon checkout. However, many items have thermal characteristics which are detectable by differential thermal analysis. These thermal characteristics may comprise a "thermal signature" which is unique to an item type and is not as sensitive to item orientation or location when presented to a point-of-sale machine as visual recognition systems.

As shown in FIG. 11, a preferred embodiment of the differential thermal analysis (DTA) system comprises an infrared impulse source 825, a thermal sensor 820, a feedback sensor 830, and a control and image processor 835. The infrared impulse source 825 provides a pulse of infrared energy whose characteristics (spectral radiance over time) are monitored by the feedback sensor 830. The pulse of infrared energy is directed at an item 810 to be identified. The thermal sensor 820 (e.g., a thermal imaging camera) is sensitive to part or all of the range of infrared radiation emitted by the item 810 both before and after the item 810 has been exposed to the infrared energy emitted by the infrared impulse source 825. The thermal sensor 820 captures a series of thermal images of the item 810 to be identified. The control and image processor 835 directs the operation of the system to assist and control the image capture, data storage, and processing necessary for item identification.

The identification sequence may be initiated by an operator or customer by a switch means or triggering means connected to the control and image processor 835. In a fully automated system, the incoming item 810 itself may trigger the start of the item identification process. The thermal sensor 820 (e.g., thermal imaging camera) captures and records an image of the item and its surroundings as a baseline reference, prior to any exposure to infrared energy. Next, the infrared impulse source 825 issues a pulse of infrared energy having known characteristics. The infrared energy pulse is directed to the item 810 which absorbs an amount of the infrared energy dependent upon the spectral absorbance of the item 810.

After the infrared energy pulse, the thermal sensor 820 acquires several more thermal images spaced out over short time intervals. By the term "thermal sensor" is meant a device that is sensitive to infrared emissions over the wavelengths of interest. Based upon the initial amount of infrared energy absorbed, the surface emissivity of the item 810, the thermal resistance from the outer item surface to its underlying thermal mass, and the overall thermal mass of the item 810, the timed sequence of thermal images will show different evolutionary patterns. The "thermal images" need not comprise "images" in the visual sense.

The patterns of the thermal images are processed by the control and image processor 835 to identify the item 810 to be recognized. Initial data (which can include, for example, measurements of the outgoing infrared energy pulse by the feedback sensor 830) can also be included in the analysis by the image processing section of the control and image processor 835. The evolutionary pattern profile of the thermal images taken of the item 810 are matched with those of a particular item or class of items to complete the image recognition process.

Selection of the time between thermal images, and the analysis of the thermal images, are based upon the thermal circuit time constants of the item 810. The thermal circuit time constants are generally independent of the absolute amount of infrared energy absorbed. Thus, the location of the item 810 within the identification zone will usually not affect the ability to identify the product. Also, because the thermal circuit properties of the item 810 are mainly bulk properties, item orientation should have little or no effect on the ability to identify the product.

The thermal sensor 820 may be embodied in a variety of forms. The thermal sensor generally must be sensitive to infrared radiation in the range of wavelengths emitted by the item 810 both before and after its exposure to the infrared energy pulse. The thermal sensor 820 may comprise a single thermal detector, or an array of thermal detectors, and may include various types of photoconductive, photovoltaic, pyroelectric, or thermopile devices, among others.

The thermal sensor 820 may have a fixed field of view (i.e., be configured so that it is "staring"), or may be movable so as to scan over a field of view.

It is possible to create packaging and/or labeling with unique differential thermal signatures to increase the positivity of identification of specific items. The packaging or labeling enhances certain thermal characteristics and creates highly identifiable thermal signatures for specific items. This packaging or labeling may be constructed of materials which emit infrared energy over only a narrow spectral band, for example, or which have a distinctive rate over more conventional materials at which the temperature of the material decays. Two or more materials with different thermal properties may also be used to create distinctive thermal signatures. Some of these materials can be of very low cost, which is an added advantage to the detection process of this embodiment.

The differential thermal analysis technique of FIG. 11 can provide an added dimension to item identification, to be used in conjunction with other object recognition techniques. Alternatively, the system can be stand alone.

An alternative embodiment of an object recognition system, utilizing a particle source and secondary X-ray emission detector, is depicted in FIG. 12. In FIG. 12, a preferred product recognition system comprises a particle source 910, a radiation detection device 930 for detecting secondary X-ray emissions, and a general purpose computer 934 to analyze the data and complete the product identification based upon comparison of captured signatures to a reference database.

Operation of the system is as follows. The produce or other item 905 to be identified is presented in front of the particle source 910 and irradiated by a stream of photons or particles 918 of sufficient energy to cause the elements in the item 905 to emit (i.e., fluoresce) its characteristic X-ray line spectra. For the particle source 910, an alpha particle source using, for example, isotope Fe-55 (i.e., Iron-55) or Americium-241 100 mCu is acceptable. The particles exit the particle source 910 from an aperture 912 on the front of its protective housing, thereby allowing particles to be directed toward the product 905 to be identified. The size and shape of the aperture 912 should be carefully selected to ensure that only the target product 905 is stimulated by the particles from the particle source 910, particularly if there are human beings expected to be in close proximity to the system.

The "secondary" X-rays 920 emitted by the target product 905 are detected by a radiation detection device 930, such as a Pulnix TM-7CN glassless CCD imager. This particular type of radiation detection device 930 is very sensitive to the secondary X-ray emissions, so that only very low levels of primary X-rays need to be used in the system. The Pulnix TM-7CN glassless CCD imager is an area array camera having dimensions of 480 pixels by 768 pixels, which should be sufficient to capture a significant number of secondary emissions emitted from the target product 905.

Output from the radiation detection device 930 is sent to a frame grabber 932, such as a data translation DT-2867 frame grabber card-slot printed circuit board (PCB) resident in the controlling computer 934. The frame grabber 932 is used to capture and store pixel data of X-rays from the secondary emissions hitting the radiation detection device 930. This results in a series of "snapshots", each of which may appear as a collection of random events of varying intensities. Each frame or snapshot of pixel data is preferably converted to histogram data to facilitate the object recognition process, as may be described with respect to FIG. 13. FIG. 13 is a diagram showing conversion of a raw video image 960 to a histogram 970 of number of occurrences versus pixel intensities (which corresponds to X-ray energy). Pixel intensity is generally an 8-bit value whose decimal equivalent range is between 0 (least intense) to 255 (most intense). Each pixel 962 provides one 8-bit pixel intensity value. The histogram data 971 in FIG. 13 is a collection representing the intensities for all of the pixels 962 within a particular frame or snapshot.

The resulting histogram 970 is then compared to histograms of pre-identified and pre-characterized objects that have been previously scanned, and whose secondary emission characteristics have been stored in a reference database resident in the general purpose computer 934. To build a database of items for purposes of identification, the system is placed in a "learn mode" wherein the items are irradiated by the low-level radiation source 910 and then scanned with the radiation detection device 930, with the system then programmed to associate the X-ray signature with the item being scanned.

Once the object has been recognized based on such a comparison, the name of the identified product is then displayed on a local monitor 936, and the product information is sent to the point-of-sale terminal for pricing.

The X-ray detection based system of FIG. 12 could be used, for example, in a warehouse to verify incoming produce, or in identifying bulk foods at the checkout counter. Unlike a visual recognition system, a system using X-ray fluorescence utilizes the chemical makeup of the item or produce being tested for recognition. The problems in visual systems associated with attempting to interpret variations in color, texture and size are minimized in the FIG. 12 system because the X-ray fluorescence system analyzes a fixed chemical composition. For example, kiwi has distinctly different chemical makeup from that of a potato, and so the X-ray identification process that utilizes the chemical makeup for identifying a product can be quite precise. Further, effects of ambient light and other visually sensitive environmental factors become less of a concern and less intrusive into the object recognition process. As an additional advantage, the FIG. 12 system can make it possible to recognize and characterize a paper bag with produce in it, in which case there is not a need to take the produce or other items to be recognized out of the bag to be identified. The system in this aspect is non-invasive system, allowing produce to be placed on a weigh platter, irradiated with particles and then sensed for secondary emissions, and identified, with the appropriate charge being determined and displayed, if desired, for the customer.

While X-ray fluorescence spectrology technology has been used in laboratory measurement systems, its use in commercial systems has generally been limited to analysis of the specific makeup and amounts of compounds in materials such as concrete and metals. So far as the inventors are aware X-ray fluorescence spectrology technology has not been used to differentiate products in a retail consumer environment.

While preferred embodiments are disclosed herein, many variations are possible which remain within the concept and scope of the invention. Such variations would become clear to one of ordinary skill in the art after inspection of the specification and drawings herein. The invention therefore is not to be restricted except within the spirit and scope of any appended claims.

What is claimed is:

1. An apparatus comprising:
   a housing having an inspection aperture;
   a light collection system positioned on one side of said inspection aperture so as to receive light reflected from objects located on the other side of said inspection aperture;
   a light separator connected to said light collection system, whereby light collected by said light collection system is separated into different color components corresponding to colors of an object to be identified;
   an optical detector positioned so as to receive said different color components, said optical detector having an output signal dependent upon intensities of said different color components, said output signal having energy peaks for each of said different color components present in said object to be identified; and
   a pattern recognition system connected to said optical detector and responsive to said output signal, wherein said pattern recognition system classifies said object based upon the relative widths of said energy peaks for a plurality of said different color components.

2. The apparatus of claim 1 wherein said light separator comprises a diffraction grating.

3. The apparatus of claim 2 wherein said optical detector comprises a two-dimensional imaging array.

4. The apparatus of claim 2 wherein said optical detector comprises a linear imaging array.

5. The apparatus of claim 4 further comprising a rotating mirror positioned so as to allow said light collection system to build up a two-dimensional image of wavelength versus position by detecting successive images as said rotating mirror rotates.

6. The apparatus of claim 4 wherein said different color components are received by different parts of said one-dimensional imaging array, such that all of said different color components are simultaneously received by said linear imaging array.

7. The apparatus of claim 1 wherein said light separator comprises a hologram.

8. The apparatus of claim 7 wherein said hologram comprises a holographic disk.

9. The apparatus of claim 8 further comprising means for rotating said holographic disk, whereby the color component received by said optical detector changes as said holographic disk is rotated.

10. The apparatus of claim 7 wherein said optical detector comprises a one-dimensional imaging array.

11. The apparatus of claim 1 wherein said light separator comprises a plurality of narrowband illumination sources operating in a time-sequential fashion such that only one of said plurality of narrowband illumination sources illuminates said object at a time.

12. The apparatus of claim 1 further comprising a white light source.

13. The apparatus of claim 1 further comprising an optical code reader sharing a housing and an exit aperture with said light collection system, said light separator and said optical detector.

14. The apparatus of claim 1 wherein said pattern recognition system classifies said object by comparing within a multi-dimensional feature space characteristics of said object with characteristics of known objects, said characteristics of said object comprising at least the relative widths of energy peaks for a plurality of said different color components and the number of energy peaks present for each of said different color components.

15. The apparatus of claim 14 further comprising a database of said known objects connected to said pattern recognition system.

16. The apparatus of claim 1, further comprising a scale for measuring a weight of said objects while said light collection system receives light reflected therefrom, wherein the classification by said pattern recognition system of said object to be recognized is further based upon said weight.

17. The apparatus of claim 1, wherein the classification by said pattern recognition system of said object to be recognized is based at least in part upon variations in intensity within said energy peaks.

18. The apparatus of claim 1, further comprising a white light source for illuminating the object to be recognized, and a lookup correction table accessible to said pattern recognition system comprising a list of correction factors for said different color components to compensate for spectral variations in light output from said white light source.

19. A method comprising the steps of:
   collecting light reflected from an object through an inspection aperture;
   separating the collected light into different color components;
   directing the different color components onto an optical detector;
   generating an output signal from said optical detector in response to said different color components;
   detecting energy peaks in said output signal for each of said different color components;
   measuring widths of said energy peaks; and
   classifying said object by comparing at least the relative widths of energy peaks for a plurality of said different color components against premeasured characteristics of known objects.

20. The method of claim 19 wherein said step of separating the collected light into different color components comprises the step of diffracting said collected light such that the direction of travel of each color component of the diffracted light depends upon the wavelength of said color component.

21. The method of claim 20 wherein different color components of said collected light are directed onto different areas of said optical detector.

22. The method of claim 20 wherein said step of directing the different color components onto an optical detector comprises the step of directing the different color components onto a linear imaging array, said method further comprising the step of changing over time the color component directed onto said optical detector by rotating a mirror.

23. The method of claim 19 wherein said step of directing the different color components onto an optical detector comprises the step of directing the different color components onto a linear imaging array, and wherein said step of separating the collected light into different color components comprises the step of sequentially selecting different color bands of light to direct onto said optical detector.

24. The method of claim 23 wherein said step of sequentially selecting different color bands of light to direct onto said optical detector comprises the step of passing said collected light through facets of a holographic disk, each facet of said holographic disk allowing one of said color bands of light to pass through.

25. The method of claim 19 wherein said step of separating the collected light into different color components comprises the step of illuminating said object with light emitted by narrowband illumination sources each differing from the others at least partially in color band of emitted light, only one of said narrowband illumination sources illuminating said object at a time.

26. The method of claim 19, further comprising the step of measuring a weight of said object while collecting light reflected from said object, wherein said step of classifying said object further comprises the step of comparing said measured weight with the premeasured characteristics of known objects.

27. The method of claim 19, further comprising the steps of measuring a weight of said object, measuring a footprint of said object, and calculating a pseudo-density of said object from a ratio of said measured weight to an area of said footprint, wherein said step of classifying said object further comprises the step of comparing said pseudo-density with the premeasured characteristics of known objects.

28. The method of claim 19, further comprising the steps of measuring a weight of said object, measuring a volume of said object, and calculating a density from a ratio of said measured weight to said volume, wherein said step of classifying said object further comprises the step of comparing said density with the premeasured characteristics of known objects.

29. The method of claim 19, wherein said step of classifying said object further comprises the step of comparing variations in intensity within said energy peaks against premeasured characteristics of known objects.

30. The method of claim 19, further comprising the steps of
illuminating said object using a white light source, and
compensating for spectral variations in light output from said white light source by applying a correction factor to said output signal from said optical detector.

31. A system comprising:
a light collection system including at least one lens and aperture, said light collection system collecting light reflected from an object to be identified;
an optical detector;
means connected to said light collection system for separating light collected by said light collection system into different color bands of light corresponding to colors of said object and for directing each color band of light onto said optical detector, said optical detector generating an output signal having an amplitude corresponding to the intensity of light received by said optical detector;
a pattern recognition system connected to said optical detector and responsive to said output signal, said object being classified by said pattern recognition system according to measured widths of energy peaks in said different color bands; and
an optical code recognizer sharing said aperture with said light collection system, said optical code recognizor comprising a decoder for identifying an encoded symbol affixed to said object.

32. The apparatus of claim 31 wherein said optical detector comprises a single photo-sensitive cell.

33. The apparatus of claim 32 further comprising a rotating mirror, whereby the color band received by said photo-sensitive cell changes as said rotating mirror rotates.

34. The apparatus of claim 32 wherein said output signal is indicative of an average color intensity of said object for each of said different color bands.

35. The object recognition system of claim 31 wherein said means for separating light collected by said light collection system into different color bands of light and for directing each color band of light onto said optical detector comprises a diffraction grating positioned such that different color bands of light are directed onto different areas of said optical detector.

36. The object recognition system of claim 31 wherein said means for separating light collected by said light collection system into different color bands of light and for directing each color band of light onto said optical detector comprises a rotating holographic disk having a plurality of facets, each facet directing a different color band of light onto said optical detector.

37. The object recognition system of claim 31 wherein said means for separating light collected by said light collection system into different color bands of light and for directing each color band of light onto said optical detector comprises a plurality of narrowband illumination sources each emitting a different color band of light and operated time-sequentially such that said object is illuminated by only one emitted color band of light at a time.

38. The object recognition system of claim 31 wherein said pattern recognition system comprises a library of known objects defined within a multi-dimensional feature space, said object recognition system classifying said object by comparing said object with said known objects within said multi-dimensional feature space.

39. An apparatus comprising:
an optical code reader, said optical code reader comprising
an optical code reader light collection system including an aperture and a lens,
a photosensitive element positioned so as to receive light gathered by said optical code reader light collection system, and
a decoder connected to said photosensitive element; and
an object recognition system, said object recognition system comprising an object recognition system light collection system sharing said aperture with said optical code reader light collection system.

40. The apparatus of claim 39 wherein said object recognition system further comprises
a light separator connected to said object recognition system light collection system, whereby light collected by said object recognition system light collection system is separated into different color components corresponding to colors of an object to be identified;
an optical detector positioned so as to receive said different color components, said optical detector generating an output signal having energy peaks dependent upon intensities of each of said different color components along a spatial axis as viewed through said aperture; and a pattern recognition system connected to said optical detector and responsive to said output signal, said object being classified by said pattern recognition system according to the energy peaks in said output signal.

41. The apparatus of claim 39, further comprising a housing containing said optical code reader and said object recognition system.

42. The apparatus of claim 41, wherein said housing comprises a platform for placing items, a first housing portion located beneath said platform, and a second housing portion located next to and above said platform, said first housing portion comprising said aperture and said second housing portion having a second aperture through which light reflected from said items may pass, and wherein said optical code reader further comprises a second optical code reader light collection system positioned to view said items through said second aperture.

43. The apparatus of claim 39, wherein said decoder is configured to recognize and decode bar codes.

44. An apparatus comprising:

a housing, said housing having a surface atop which items may be placed and a first aperture and second aperture for viewing said items;

a multi-planar optical code reader, said multi-planar optical code reader comprising a first partial field-of-view code reader utilizing said first aperture for viewing said items and a second partial field-of-view code reader utilizing said second aperture for viewing said items, said first partial field-of-view code reader and said second partial field-of-view code reader having at least partially overlapping fields of view; and an object recognition system sharing at least one of said first aperture and said second aperture with said multi-planar optical code reader.

45. The apparatus of claim 44, wherein said housing comprises a base enclosure portion in which said first aperture is located and an upper housing enclosure portion in which said second aperture is located, said surface atop which items may be placed being located on a top surface of a platform above said base enclosure.

46. The apparatus of claim 44, wherein said object recognition system comprises:

a light collection system;

a light separator for receiving light collected by said light collection system and separating the received light into different color components corresponding to colors of said items placed atop said surface of said housing;

an optical detector positioned so as to receive said different color components, said optical detector having an output signal having energy peaks dependent upon intensities of each of said different color components along a spatial axis as viewed through said at least one of said first aperture and said second aperture shared with said multi-planar optical reader; and a pattern recognition system connected to said optical detector and responsive to said output signal, said items being classified by said pattern recognition system according to characteristics identified in said output signal, said characteristics including at least said energy peaks.

47. A method comprising the steps of:

receiving, through an aperture, light reflected from an object;

detecting said light using a first photodetector, and generating a first output signal therefrom;

attempting to identify, in response to said first output signal, an encoded symbol;

dividing said light into color components and detecting the different color components using a second photodetector, and generating a second output signal therefrom, said second output signal comprising energy peaks for said different color components; and attempting to recognize, in response to said second output signal, an object meeting predefined characteristics by evaluating the color of the object as indicated by the color components of said light, and by evaluating the size of the object and its features as indicated by the relative widths and positions of said energy peaks for said different color components.

48. The method of claim 47, wherein said step of detecting said light using a first photodetector and said step of dividing said light into color components and detecting the different color components using a second photodetector are performed simultaneously.

49. An apparatus comprising:

a housing an object recognizor located within said housing, said object recognizor comprising a light collection system;

a light separator connected to said light collection system, whereby light collected by said light collection system is separated into different color components corresponding to colors of an object to be identified;

an optical detector positioned so as to receive said different color components, said optical detector having an output signal dependent upon intensities of said different color components; and a pattern recognition system connected to said optical detector and responsive to said output signal, said object being classified by said pattern recognition system according to widths of energy peaks in said output signal for said different color components; and an optical code reader located within said housing, said optical reader sharing an aperture with the light collection system of said object recognizor.

* * * * *